US006600993B1

(12) United States Patent
Kaneko et al.

(10) Patent No.: US 6,600,993 B1
(45) Date of Patent: Jul. 29, 2003

(54) NAVIGATION SYSTEM

(75) Inventors: Michihiro Kaneko, Tsurugashima (JP); Keiichi Yamauchi, Tsurugashima (JP); Koichi Nagaki, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 09/707,964

(22) Filed: Nov. 8, 2000

(30) Foreign Application Priority Data

Nov. 8, 1999 (JP) .......................... 11-316894
Nov. 25, 1999 (JP) .......................... 11-334640

(51) Int. Cl.$^7$ ............................................. G01C 21/00
(52) U.S. Cl. ...................... 701/208; 701/200; 340/990; 342/375
(58) Field of Search ................................. 701/200, 207, 701/208, 209, 210, 211; 340/990, 995; 342/375; 386/125

(56) References Cited

U.S. PATENT DOCUMENTS 5,944,768 A * 8/1999 Ito et al. ..................... 701/200

* cited by examiner

Primary Examiner—William A. Cuchlinski, Jr.
Assistant Examiner—Arthur D. Donnelly
(74) Attorney, Agent, or Firm—Sughrue Mion, PLLC

(57) ABSTRACT

A navigation system is provided with: a present position detecting device for detecting a present position of a movable body; a reading device for reading map data recorded on a recording medium; a nonvolatile storage device for storing the map data thereon; a selecting device for selecting an area as an object to be transmitted in accordance with the present position; a transmitting device for reading the recorded map data corresponding to the area from the recording medium and transmitting the read map data to the nonvolatile storage device at a predetermined timing; and a controlling device for controlling a navigation operation to assist the movable body in traveling on the basis of the recorded map data on the recording medium and the stored map data on the nonvolatile storage device.

32 Claims, 25 Drawing Sheets

FIG. 2
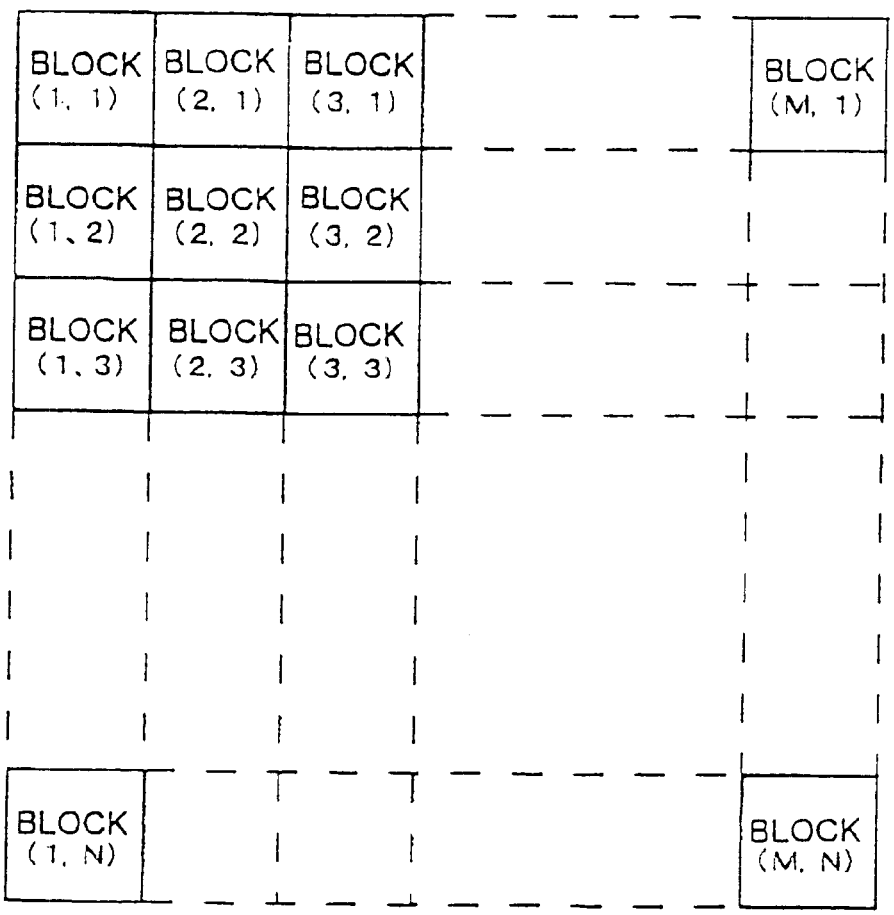
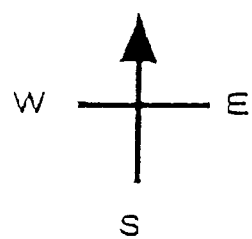

FIG. 3

| ORDER OF DATA | NAME OF BLOCK MAP DATA |
|---|---|
| 1 | BLOCK(1, 1) |
| 2 | BLOCK(2, 1) |
| 3 | BLOCK(3, 1) |
| ⋮ | ⋮ |
| M | BLOCK(M, 1) |
| M+1 | BLOCK(1, 2) |
| M+2 | BLOCK(2, 2) |
| M+3 | BLOCK(3, 2) |
| ⋮ | ⋮ |
| 2M+1 | BLOCK(1, 3) |
| 2M+2 | BLOCK(2, 3) |
| 2M+3 | BLOCK(3, 3) |
| ⋮ | ⋮ |
| M(N−1)+1 | BLOCK(1, N) |
| ⋮ | ⋮ |
| M·N | BLOCK(1, N) |

FIG. 8A
FIG. 8B
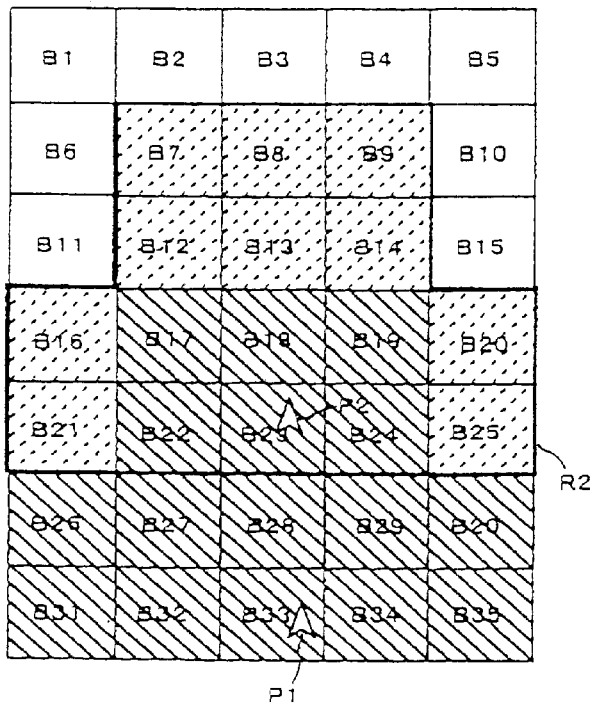
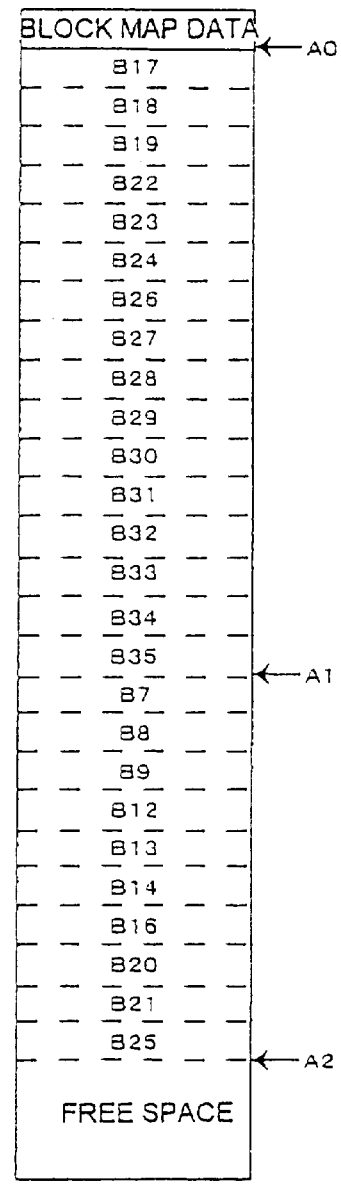

FIG. 9A
FIG. 9B
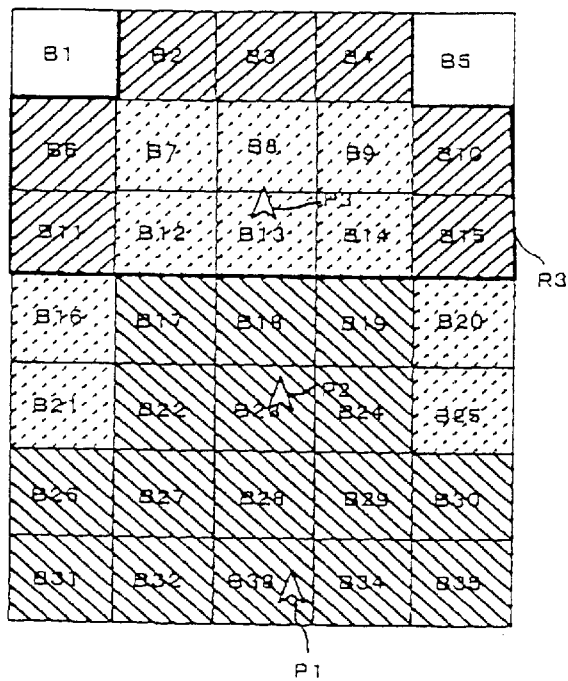
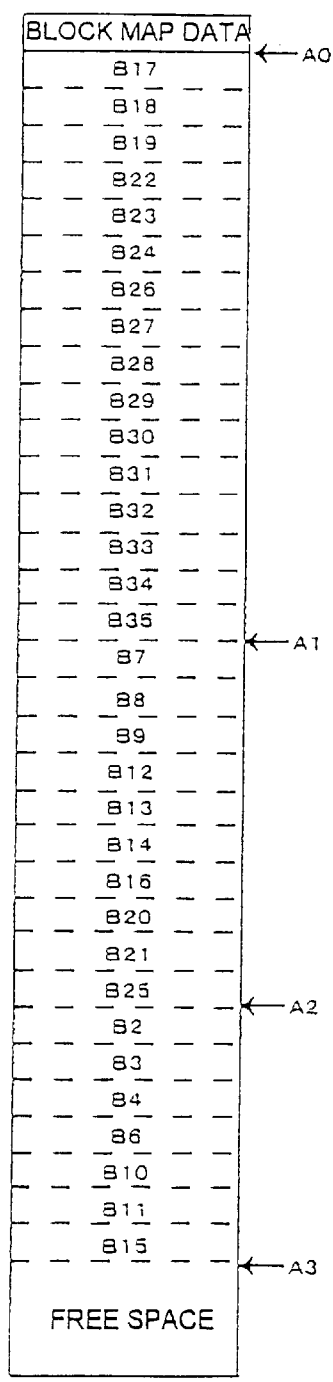

FIG. 13

| B1 | B2 | B3 | B4 | B5 |
|----|----|----|----|----|
| B6 | B7 | B8 | B9 | B10 |
| B11 | B12 | B13 | B14 | B15 |
| B16 | B17 | P5 B18 | D2 B19 | B20 |
| B21 | B22 | B23 | B24 | B25 |
| B26 | B27 | P4 B28 | B29 D1 | B30 |
| B31 | B32 | B33 | B34 | B35 |

FIG. 22

| B101 | B102 | B103 | B104 | B105 |
|------|------|------|------|------|
| B106 | B107 | B108 | B109 | B110 |
| B111 | B112 | B113 | B114 | B115 |
| B116 | B117 | P2 B118 | O2 B119 | B120 |
| B121 | B122 | B123 | B124 | B125 |
| B126 | B127 | P1 B128 | O1 B129 | B130 |
| B131 | B132 | B133 | B134 | B135 |

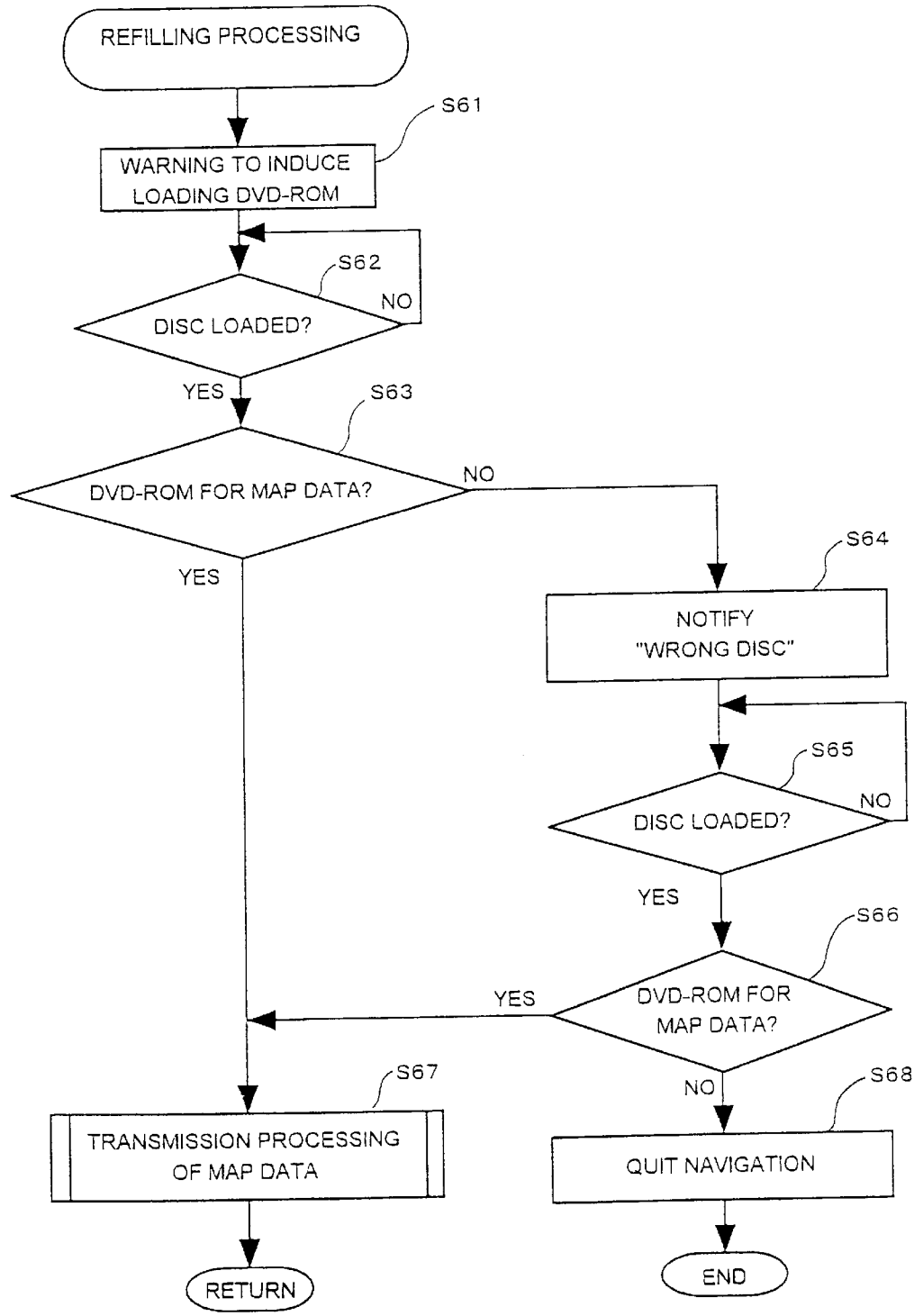

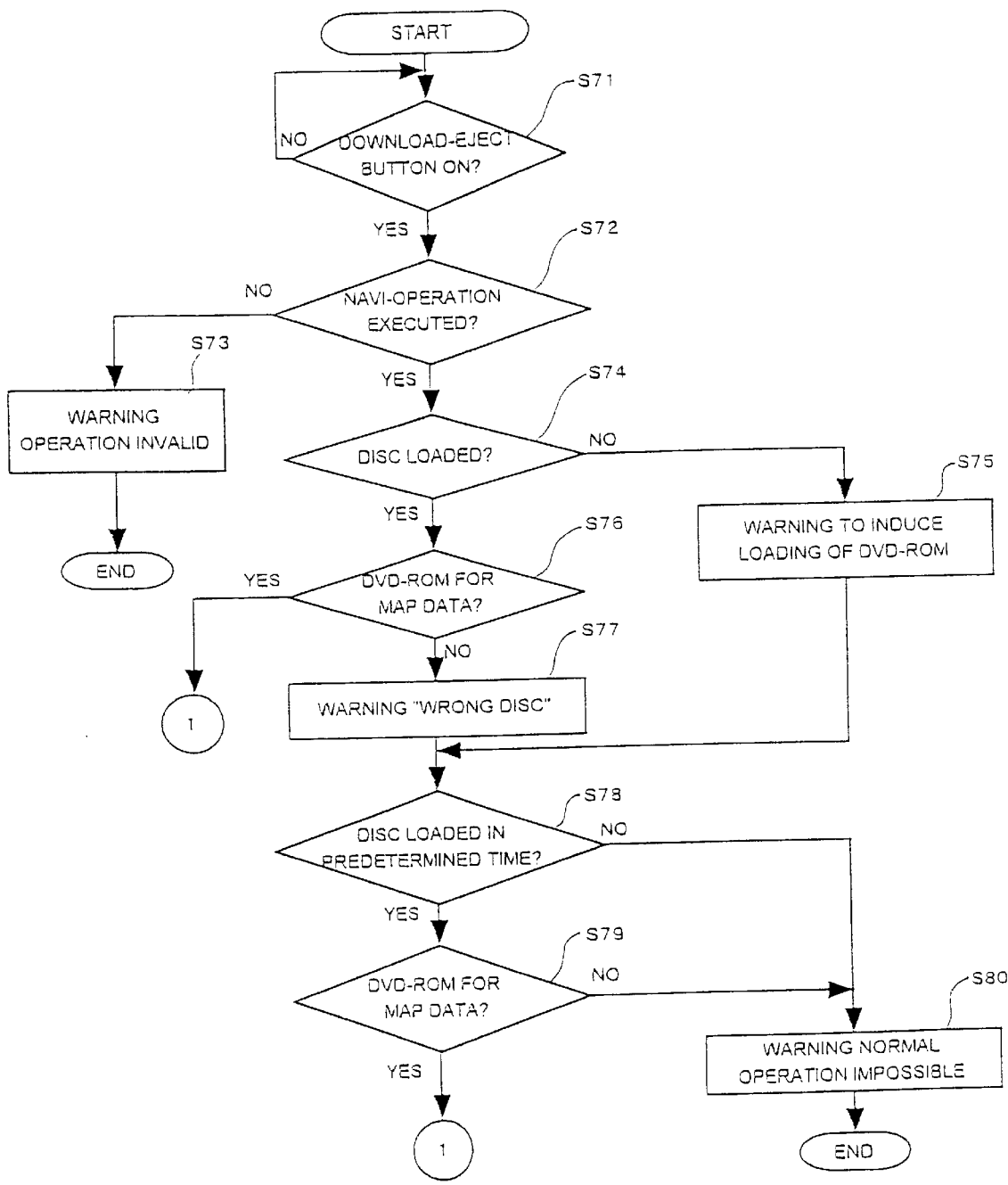

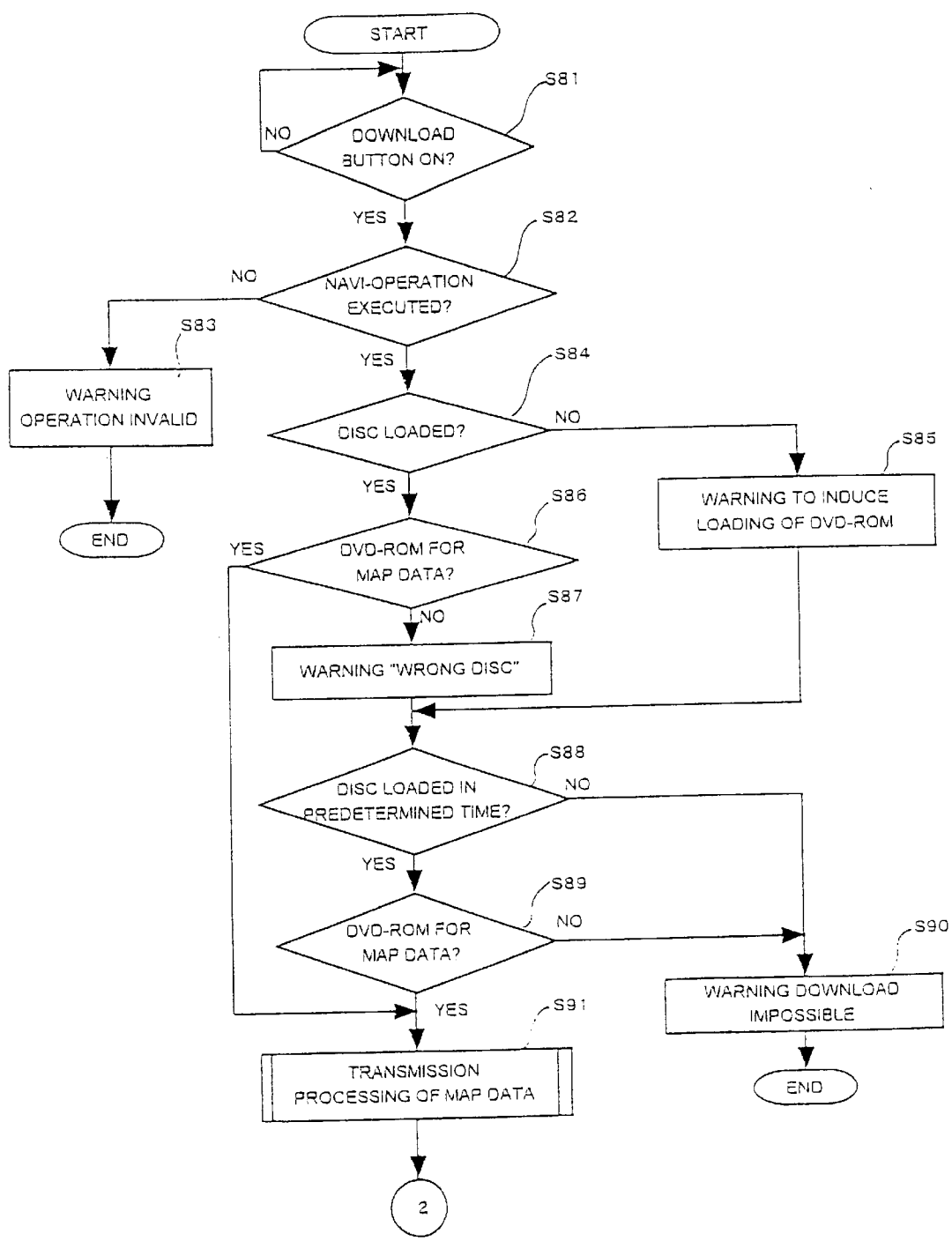

NAVIGATION SYSTEM

BACKGROUND OF THE INVENTION

1. Field of the Invention

The present invention relates to a navigation system performing navigation operation by using map data, and more particularly relates to the navigation system having a storage device, such as a hard disc, storing the map data in it.

2. Description of the Related Art

Conventionally, a navigation system, having a DVD-ROM drive or a CD-ROM drive, reading out the map data stored in a DVD-ROM or CD-ROM as a recording medium, and performing the navigation operation, is widely used. If the navigation system is mounted in a vehicle, it detects a present position of the vehicle when it performs the navigation operation, reading out the map data indicating areas around the present position, and displaying the map image made on the basis of the read map data with a mark indicating the present position of the vehicle on a screen.

Recently, a recording medium storing music data or image data in DVD-Video format or DVD-audio format, such as DVD-ROM, is provided. Therefore music or image can be reproduced by using the DVD-ROM on the navigation system having a DVD-ROM drive. Actually, some users hope to play the DVD-ROM on the navigation system while driving. However, in the conventional navigation system, the DVD-ROM storing the map data needs to be always loaded on the navigation system while the navigation operation is performed, so that it is difficult to use the navigation system for purposes other than originally intended. For example, if the user presses an eject button to eject the DVD-ROM storing the map data compulsorily while the navigation operation is performed, the conventional navigation system is configured to stop the operation.

In the navigation system, a nonvolatile storage device having high capacity other than the recording medium, for example, a hard disc can be mounted. If the whole data of the DVD-ROM storing the map data is installed on the hard disc, and the navigation system is configured to read out the map data from the hard disc when the navigation operation is performed, the DVD-ROM drive of the navigation system can be used for purposes other than originally intended. In this case, the hard disc drive has a quick access time so that there is an advantage in displaying the image on the screen at high speed.

However, it takes quite a long time to install the whole data of the DVD-ROM storing the map data on the hard disc. Further, it is a burdensome operation for the user. Moreover, DVD-ROM has a high capacity. For example, the capacity of a single sided one-layer DVD-ROM is 4.7G bytes, and that of a single sided two-layer DVD-ROM is 8.7G bytes. Therefore, it is necessary to use the hard disc having such a capacity. Furthermore, even the map data corresponding to an area having a low frequency of travelling is installed on the hard disc, so that the hard disk is cluttered with useless data. Therefore, if the hard disc is further used for purposes other than originally intended such that it records music data, etc., there may be no sufficient capacity for it. In addition, if the DVD-ROM is upgraded to a new version, it is necessary to install new data on the hard disc every time.

As mentioned above, using the hard disc with the DVD-ROM or the CD-ROM for the navigation system causes a lot of disadvantages in respect of usability, the cost of maintenance or the like.

SUMMARY OF THE INVENTION

It is therefore an object of the present invention to provide a navigation system having a hard disc, to which necessary data is automatically transferred, so that it can have good usability.

The above object of the present invention can be achieved by a navigation system. The navigation system is provided with: a present position detecting device for detecting a present position of a movable body; a reading device for reading map data recorded on a recording medium; a nonvolatile storage device for storing the map data thereon; a selecting device for selecting an area as an object to be transmitted in accordance with the present position; a transmitting device for reading the recorded map data corresponding to the area from the recording medium and transmitting the read map data to the nonvolatile storage device at a predetermined timing; and a controlling device for controlling a navigation operation to assist the movable body in traveling on the basis of the recorded map data on the recording medium and the stored map data on the nonvolatile storage device.

According to the navigation system of the present invention, a present position detecting device detects a present position of a movable body. A reading device reads map data in accordance with the present invention recorded on a recording medium. Then a controlling device controls a navigation operation to assist the movable body in traveling on the basis of the read map data On the other hand, a selecting device selects an area as an object to be transmitted in accordance with the present position. Then a transmitting device reads the recorded map data corresponding to the area from the recording medium. Further, the transmitting device transmits the read map data to the nonvolatile storage device at a predetermined timing. The transmitted map data is stored on the nonvolatile storage device. In this case, the controlling device controls the navigation operation on the basis of the stored map data on the nonvolatile storage device.

Therefore after the map data is transmitted to the nonvolatile storage device once, the navigation operation is continued even if the recording medium is not loaded in the reading device. As a result, it is possible to provide the navigation system having high usability.

In one aspect of the navigation system, the nonvolatile storage device, which stores the map data transmitted from the reading device, has a faster access time than the reading device.

According to the navigation system, if the navigation operation is controlled on the basis of the map data stored on the nonvolatile storage device, a reading time of the map data is faster than that on the basis of the map data recorded on the recording medium. Therefore the navigation operation can be executed at a high speed.

In another aspect of the navigation system, the nonvolatile storage device, which stores the map data transmitted from the reading device, is provided with a hard disc device.

According to the navigation system, the map data is transmitted to and stored on the hard disc device having a high capacity and a high access time. Therefore the navigation operation can be executed at a high speed.

In another aspect of the navigation system, if the map data necessary to the navigation operation is stored on the nonvolatile storage device, the controlling device controls the navigation operation on the basis of the map data stored on the nonvolatile storage device. On the other hand, if the map data necessary to the navigation operation on the recording medium is readable and is not stored on the nonvolatile storage device, the controlling device controls the navigation operation on the basis of the recorded map data on the recording medium.

According to the navigation system, after the map data is transmitted to the nonvolatile storage device, the navigation operation is continued even if the recording medium is not loaded in the reading device. Therefore it is possible to provide the navigation system having high usability.

In another aspect of the navigation system, the transmitted map data is stored on a map data storing area of the nonvolatile storage device.

According to the navigation system, an area other than the map data storing area can be use for storing another data. Therefore the nonvolatile storage device can have a wide applicability.

In another aspect of the navigation system, the navigation system further had a map data deleting device. If the map data storing area becomes full at the transmitting of the map data by the transmitting device, the map data deleting device deletes part of the map data stored on the map data storing area in accordance with a predetermined condition.

According to the navigation system, if the whole amount of the transmitted map data is larger than a capacity of a free space of the map data storing area, the transmitted map data can be reliably stored on the nonvolatile storage device.

In another aspect of the navigation system, the transmitting device transmits the map data every time when the movable body moves a predetermined distance.

According to the navigation system, the map data is transmitted to the nonvolatile storage device at the timing that the object of transmitting is nearly changed. Therefore the transmission is smoothly executed.

In another aspect of the navigation system, block map data is recorded on the recording medium every block unit into which the entire map is divided. Then the reading-device reads the map data from the recording medium in the block map data unit. Further, the nonvolatile storage device stores and reads the map data in the block map data unit.

According to the navigation system, the transmission is executed by selecting the block map data unit and transmitting it sequentially. Therefore it is possible to manage the transmission processing and the map data easily.

In another aspect of the navigation system, the block map data unit is an area having two parallel sides in an east-west direction and two parallel sides in a north-south direction.

According to the navigation system, it is possible to select the block unit on the basis of latitude and longitude corresponding to the detected present position. Therefore it is possible to select the object area of transmitting easily.

In another aspect of the navigation system, the transmitting device determines whether the block map data as an object of transmitting is stored on the nonvolatile storage device. Further, the transmitting device transmits only block map data which is not stored on the nonvolatile storage.

According to the navigation system, it is possible to prevent unnecessary transmission and execute the transmission processing speedily.

In another aspect of the navigation system, the object of transmitting by the transmitting device is set to an area comprising a plurality of block units on the basis of the block unit including the present position.

According to the navigation system, it is possible to transmit the block unit having a high possibility that the movable body passes to the nonvolatile storage device in advance.

In another aspect of the navigation system, the object of transmitting by the transmitting device is set to the area having a broader portion in a forward side of a travelling direction.

According to the navigation system, it is possible to transmit the block unit having a high possibility that the movable body passes in a short period to the nonvolatile storage device in advance.

In another aspect of the navigation system, the object of transmitting by the transmitting device is set to an area comprising a plurality of block units, which is overlapped with an optimum route from the present position to a destination.

According to the navigation system, it is possible to transmit the block unit having a high possibility that the movable body is slated to pass to the nonvolatile storage device in advance.

The above object of the present invention can be achieved by a navigation system. The navigation system is provided with: a present position detecting device for detecting a present position of a movable body; a communicating device for communicating with an external of the movable body to obtain map data; a nonvolatile storage device for storing the map data thereon; a selecting device for selecting an area as an object to be transmitted in accordance with the present position; a transmitting device for obtaining the map data from the external of the movable body through the communicating device and transmitting the obtained map data to the nonvolatile storage device at a predetermined timing; and a controlling device for controlling a navigation operation to assist the movable body in traveling on the basis of the recorded map data on the recording medium and the stored map data on the nonvolatile storage device.

According to the navigation system of the present invention, a present position detecting device detects a present position of a movable body. A selecting device selects an area as an object to be transmitted in accordance with the present position. A communicating device communicates with an external of the movable body to obtain map data corresponding to the area. A transmitting device obtains the map data corresponding to the area from the external of the movable body through the communicating device. Further, the transmitting device transmits the obtained map data to the nonvolatile storage device at a predetermined timing. Then the map data is stored on a nonvolatile storage device. A controlling device controls a navigation operation to assist the movable body in traveling on the basis of the recorded map data on the recording medium and the stored map data on the nonvolatile storage device.

Therefore after the map data is transmitted to the nonvolatile storage device once, the navigation operation is continued even if the communication is temporarily suspended. As a result, it is possible to provide the navigation system having high usability.

The above object of the present invention can be achieved by a navigation system. The navigation system is provided with: a present position detecting device for detecting a present position of a movable body; a reading device for being loaded with a recording medium on which map data is recorded and reading the map data from the loaded recording medium; a nonvolatile storage device for storing the map data thereon; an operating device for providing an instruction to eject the recording medium loaded in the reading device; a selecting device for selecting an area as an object to be transmitted in accordance with the present position; a transmitting device for reading the map data from the recording medium through the reading device and transmitting the read map data to the nonvolatile storage device when the instruction to eject is provided by the operating device; an eject controlling device for controlling an ejecting operation of the recording medium from the reading device after the transmitting operation is completed by the transmitting device; and a controlling device for controlling a navigation operation to assist the movable body in traveling on the basis of the stored map data on the nonvolatile storage device after the recording medium is ejected from the reading device.

According to the navigation system, a present position detecting device detects a present position of a movable body. A reading device reads map data in accordance with the present invention recorded on a recording medium. Then a controlling device controls a navigation operation to assist the movable body in traveling on the basis of the read map data.

On the other hand, an operating device provides an instruction to eject the recording medium loaded in the reading device. A selecting device selects an area as an object to be transmitted in accordance with the present position. Then a transmitting device reads the map data from the recording medium through the reading device and transmits the read map data to the nonvolatile storage device. Then the map data is stored on the nonvolatile storage device. An eject controlling device controls an ejecting operation of the recording medium from the reading device after the transmitting operation is completed by the transmitting device. A controlling device controls the navigation operation on the basis of the stored map data on the nonvolatile storage device.

Therefore after the map data is transmitted to the nonvolatile storage device once, the navigation operation is continued even if the recording medium is rejected. As a result, it is possible to provide the navigation system having high usability.

In one aspect of the navigation system, the nonvolatile storage device, which stores the map data transmitted from the reading device, has a faster access time than the reading device.

According to the navigation system, if the navigation operation is controlled on the basis of the map data stored on the nonvolatile storage device, a reading time of the map data is faster than that on the basis of the map data recorded on the recording medium. Therefore the navigation operation can be executed at a high speed.

In another aspect of the navigation system, the nonvolatile storage device, which stores the map data transmitted from the reading device, is provided with a hard disc device.

According to the navigation system, the map data is transmitted to and stored on the hard disc device having a high capacity and a high access time. Therefore the navigation operation can be executed at a high speed.

In another aspect of the navigation system, the transmitted map data is stored on a map data storing area of the nonvolatile storage device.

According to the navigation system, an area other than the map data storing area can be use for storing another data. Therefore the nonvolatile storage device can have a wide applicability.

In another aspect of the navigation system, the navigation system further has a notifying device. The notifying device notifies an executing status of transmitting by the transmitting device.

According to the navigation system, a user can understand that the recording medium is used for the transmission processing after the recording medium is ejected.

In another aspect of the navigation system, the notifying device notifies a guide message to select continuing or quitting of the navigation operation when the instruction to eject is provided by the operating device. The operation device further provides an instruction to continue or quit the navigation operation corresponding to the guide message. The transmitting device transmits the map data when the instruction to continue the navigation operation is provided by the operation device. The controlling device quits the navigation operation when the instruction to quit the navigation operation is provided by the operation device.

According to the navigation system, it is possible to complete the ejection of the recording medium without executing unnecessary transmission if a user determines that it is unnecessary to continue the navigation operation.

In another aspect of the navigation system, the notifying device notifies a warning to induce loading of the recording medium in the reading device if an necessary map data is not stored on the nonvolatile storage device while the navigation operation is executed on the basis of the map data stored on the nonvolatile storage device. The transmitting device transmits the necessary map data if the recording medium is loaded in the reading device in accordance with the warning, the controlling device quits the navigation operation if the recording medium is not loaded in the reading device.

According to the navigation system, if the movable body goes out of a predetermined area, the navigation operation can be smoothly continued by newly storing the necessary map data on the nonvolatile storage device.

In another aspect of the navigation system, the notifying device notifies the warning repeatedly predetermined times if the recording medium is not loaded in the reading device despite of the warning. The controlling device quits the navigation operation if the recording medium is not loaded in the reading device after the warning is notified the predetermined times.

According to the navigation system, if a recording medium which is different from the recording medium having the map data is mistakenly loaded, it is possible to give a chance to reload a proper recording medium. Further, it is possible to prevent suspension of the navigation operation more than necessary.

In another aspect of the navigation system, block map data is recorded on the recording medium every block unit into which the entire map is divided. Then the reading device reads the map data from the recording medium in the block map data unit. Further, the nonvolatile storage device stores and reads the map data in the block map data unit.

According to the navigation system, the transmission is executed by selecting the block map data unit and transmitting it sequentially. Therefore it is possible to manage the transmission processing and the map data easily.

In another aspect of the navigation system, the transmitting device determines whether the block map data as an object of transmitting is stored on the nonvolatile storage device. Further, the transmitting device transmits only block map data which is not stored on the nonvolatile storage.

According to the navigation system, it is possible to prevent unnecessary transmission and execute the transmission processing speedily.

In another aspect of the navigation system, the object of transmitting by the transmitting device is set to an area comprising a plurality of block units on the basis of the block unit including the present position.

According to the navigation system, it is possible to transmit the block unit having a high possibility that the movable body passes to the nonvolatile storage device in advance.

In another aspect of the navigation system, the object of transmitting by the transmitting device is set to an area comprising a plurality of block units, which is overlapped with an optimum route from the present position to a destination.

According to the navigation system, it is possible to transmit the block unit having a high possibility that the movable body is slated to pass to the nonvolatile storage device in advance.

The above object of the present invention can be achieved by a navigation system. The navigation system is provided with: a present position detecting device for detecting a present position of a movable body; a reading device for being loaded with a recording medium on which map data is recorded and reading the map data from the loaded recording medium; a nonvolatile storage device for storing the map data thereon; an operating device for providing an instruction to transmit the map data from the reading device to the nonvolatile storage device; a selecting device for selecting an area as an object to be transmitted in accordance with the present position; and a transmitting device for reading the map data from the recording medium through the reading device and transmitting the read map data to the nonvolatile storage device when the instruction to transmit is provided by the operating device.

According to the navigation system, a present position detecting device detects a present position of a movable body. A reading device reads map data in accordance with the present invention recorded on a recording medium. Then a controlling device controls a navigation operation to assist the movable body in traveling on the basis of the read map data.

On the other hand, an operating device provides an instruction to transmit the map data from the reading device to the nonvolatile storage device. A selecting device selects an area as an object to be transmitted in accordance with the present position. Then a transmitting device reads the map data from the recording medium through the reading device and transmits the read map data to the nonvolatile storage device. Then the map data is stored on the nonvolatile storage device. A controlling device controls the navigation operation on the basis of the stored map data on the nonvolatile storage device.

Therefore if a user intends to transmit the map data to nonvolatile storage device, the map data is transmitted to the nonvolatile storage device. Then the navigation operation is continued on the basis of the stored map data on the nonvolatile storage device. As a result, it is possible to provide the navigation system having high usability.

In another aspect of the navigation system, the object of transmitting by the transmitting device is set to an area selected on the basis of the present position.

According to the navigation system, it is possible to transmit the block unit having a high frequency of use to the nonvolatile storage device in advance.

In another aspect of the navigation system, the object of transmitting by the transmitting device is set to an area around a designated point or a designated area by a user.

According to the navigation system, it is possible to transmit the block. unit which a user intends to use to the nonvolatile storage device in advance.

In another aspect of the navigation system, the object of transmitting by the transmitting device is set to an area around an optimum route from the present point to a destination.

According to the navigation system, it is possible to transmit the block unit having a high possibility that the movable body is slated to pass to the nonvolatile storage device in advance.

In another aspect of the navigation system, the operation device provides an instruction to seek an optimum route to a designated destination, the transmitting device transmits the map data when seeking of the optimum route is completed.

According to the navigation system, it is possible to transmit the map data to the nonvolatile storage device automatically if a user designates a destination.

BRIEF DESCRIPTION OF THE DRAWINGS

FIG. 2 is an explanatory view showing a concept of a block as a divisional unit of map data stored on a recording medium;

FIG. 3 is a diagram showing an example of a data structure in case that the map data having block units shown in FIG. 2 is stored on the recording medium;

FIG. 8A is a diagram showing the status of the peripheral blocks when the vehicle move form one self-vehicle position to another self-vehicle position;

FIG. 8B is a diagram showing the assignment of the block map data stored on the map data storing area of the storage device;

FIG. 9A is a diagram showing the status of the peripheral blocks when the vehicle move form one self-vehicle position to another self-vehicle position;

FIG. 9B is a diagram showing the assignment of the block map data stored on the map data storing area of the storage device;

FIG. 13 is a diagram showing a display range corresponding to the self-vehicle position;

FIG. 22 is a diagram showing a display area corresponding to the self-vehicle positioned;

FIG. 23 is a flaw chart showing a refilling processing when necessary map data is not stored on the storage device;

FIG. 24 is a flaw chart showing the transmission processing at the time an eject download button is pressed; and FIG. 25 is a flaw chart showing the transmission processing at the time a download button is pressed.

DETAILED DESCRIPTION OF THE PREFERRED EMBODIMENTS

The preferred embodiments of the present invention will be explained referring to FIGS.

[I] First Embodiment

Figure 1:
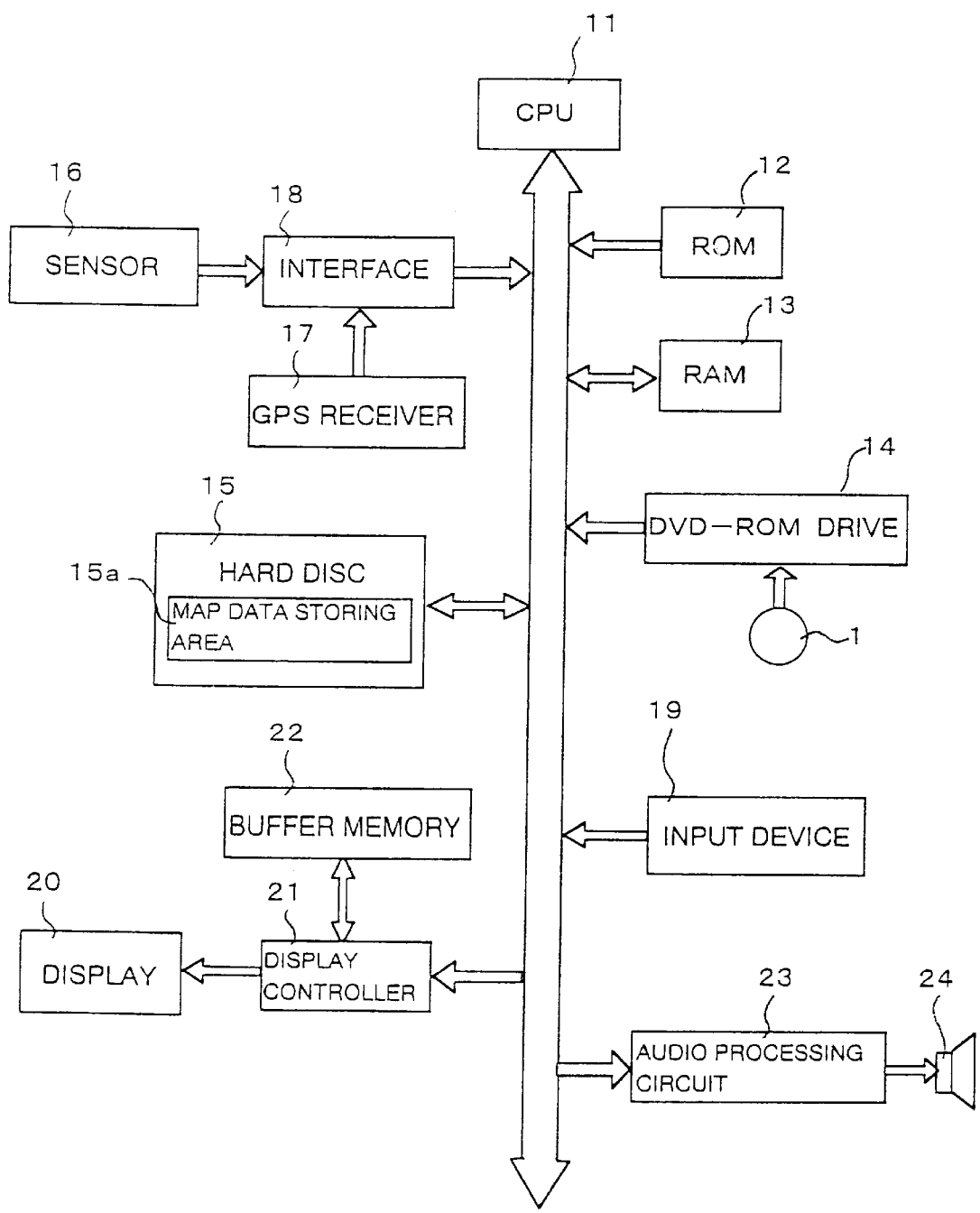
FIG. 1 is a block diagram showing the entire construction of the navigation system of the present invention.

FIG. 1 is a block diagram showing the entire construction of the navigation system of the present invention. The navigation system shown in FIG. 1 is provided with a CPU 11, a ROM 12, a RAM 13, a DVD-ROM drive 14, a hard disc 15, a sensor 16, a GPS receiver 17, an interface 18, an input device 19, a display 20, a display controller 21, a buffer memory 22, an voice processing circuit 23, and a speaker 24.

In FIG. 1, the CPU 11 controls the entire operation of the navigation system. The CPU 11 is connected to each element of the navigation system. The CPU 11 reads out a control program stored on the ROM 12, storing data in process on the RAM 13 temporarily.

The DVD-ROM 1 storing map data can be loaded in the DVD-ROM drive 14 and ejected from the DVD-ROM drive 14. When the DVD-ROM 1 is loaded, the DVD-ROM drive 14 read out the map data from the DVD-ROM 1. DVD-ROM has a high capacity such that the capacity of a single sided one-layer DVD-ROM is 4.7G bytes, and that of a single sided two-layer DVD-ROM is 8.7G bytes. Pits corresponding to recording data are recorded on the DVD-ROM 1. The recording data is read out from the DVD-ROM 1 by using a pick up of the DVD-ROM drive 14. The DVD-ROM drive 14 has a motor for ejecting, so that the DVD-ROM 1 can be ejected by the motor.

The map data including road shape data necessary to the navigation operation is stored on the DVD-ROM 1. Further, various relative data, such as facility data, name data, and the like, is stored on the DVD-ROM 1 corresponding to the road shape data. In the embodiment, the whole map is divided into each block as a unit area like a mesh. Then the map data corresponding to each block is handled as block map data. A plurality of block map data is recorded on the DVD-ROM 1.

FIG. 2 is an explanatory view showing a concept of a block as a divisional unit of the map data stored on the DVD-ROM 1. As shown in FIG. 2, the whole area of the map is divided into mesh blocks having M blocks in an east-west direction and N blocks in a south-north direction. The map data of the DVD-ROM 1 is handled as the unit of a mesh block. In FIG. 2, block (i, j) is defined as the ith block from the west and the jth block from the north. The whole map data is comprised of aggregate of M blocks by N blocks having the same figures from block (1, 1) in the north-west end to block (M, N) in the east-south end.

In FIG. 2, the figure of the whole of the map is a rectangle. The figure of each block is also a rectangle. However, in practical applications, the maps having complicated figures may be used. Further, the figure of each block is not limited to a rectangle. In the following explanation, for the sake of simplicity, the figure of each block is set to a rectangle. However, if the figure becomes more complicated, the present invention can be applied to the map having the figure.

FIG. 3 is a diagram showing an example of a data structure in case that the map data having block units shown in FIG. 2 is stored on the DVD-ROM 1. In FIG. 3, each of block map data includes road figure data of each block and relevant data associated with it. Each of block map data is labeled a specified name every block to be distinguished. Each block map data in each block of M blocks by N blocks is stored on the DVD-ROM 1 in order. The order of block map data show in FIG. 3 is just an example. The block map data can be stored in deferent order from it. The block map data can be stored on various areas by species of each block.

Turning back to FIG. 1, the hard disc 15 is a nonvolatile storage device in which various data, such as the map data, etc., is read out and written. The hard disc can be used for a lot of applications, and store various data, such as music data, image data, application program, etc. Part of the hard disc 15 is assigned as map data storage area 15a, and used for an area where the map data of the DVD-ROM 1 is transferred and stored. For example, about 1G to 2G bytes of free space of the hard disk 15 can be assigned as the map data storage area 15a. If the capacity of the hard disc 15 is larger, the amount of free space for the map data storage area 15a also can be larger. The detail explanation about transferring the map data to the hard disc 15 will be done later.

The sensor 16 is configured to include various sensors necessary to detect the present position of the vehicle. Specifically, the sensor 16 includes a vehicle speed sensor to detect the status of driving of the vehicle, a mileage sensor, a direction sensor, etc. The GPS receiver 17 receives a radio wave from a satellite, outputting position data.

The interface 18 interfaces among the sensor 16, the GPS receiver 17, and the CPU 11. The CPU 11 determines the present position of the self-vehicle data on the basis of the sensor output from the sensor 16 and the position data from the GPS receiver 17. The determined present position of the self-vehicle is compared with the above-mentioned map data and corrected through the use of a map-matching process, etc. by the CPU 11.

The input device 19 is comprised of a key unit, or a remote control unit having the key unit, etc., and outputs a signal corresponding to a key input to the CPU 11.

The display 20 is comprised of, for example, a CRT, a liquid crystal display device, etc. The display 20 displays the map data in various manners and the determined present position of the self-vehicle as a car mark under the control of the display controller 21.

The display controller 21 generates display data to be displayed on the display 21, storing it on a buffer memory 22 temporarily, reading out it from the buffer memory 22 at an appropriate timing, and outputting it to the display 21.

The audio processing circuit 23 generates the predetermined audio signal under the control of the CPU 11. The audio signal amplified to an appropriate level in the audio processing circuit 23 is outputted from the speaker 24. One example of such an audio signal is a guide voice signal to guide the vehicle to a route to a destination.

In this embodiment, the map data stored on the DVD-ROM 1 is read out at the navigation operation. Then, display processing for displaying the map data on the display 20 and the map-matching processing are performed. In addition, the map data necessary for the navigation operation is transmitted to the hard disc 15 at an appropriate timing and stored on it. In the processing of transmitting the map data, blocks as objects for the processing are selected on the basis of the determined present position of the self-vehicle and in accordance with the predetermined condition. The map data stored on the hard disc 15 once is maintained on it unless the map data is deleted. After that, it is possible to read out the map data from the hard disc instead of the DVD-ROM 1, and to perform the operation of navigation by using the map data.

Next, the methods of transmitting of the map data to the hard disc 15 will be explained with reference to FIGS. 4 to 11. In this embodiment there are two methods of selecting the block areas as objects for the processing of transmitting the map data, and there are two methods of transmitting the map data corresponding to the each of two methods of selecting the block areas respectively. Each of the two methods of transmitting will be explained thereinafter.

Figure 4:
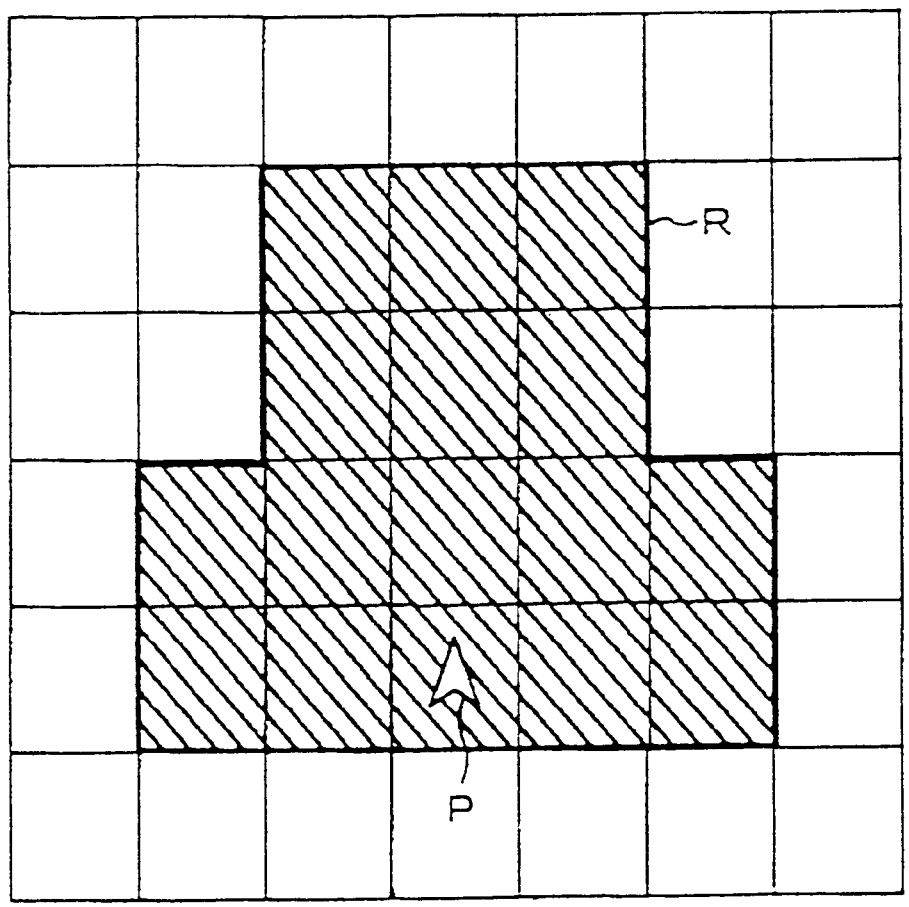
FIG. 4 is a diagram showing the block areas as the objects for the processing of transmitting the map data.

First, the first methods of transmitting the map data to the hard disc, 15 will be explained with reference to FIGS. 4 to 9. FIG. 4 is a diagram showing the block areas as the objects for the processing of transmitting the map data. For the sake of simplicity, it is assumed that the block areas as the objects are within areas of, when viewed from the vehicle position, 7 blocks in a lateral direction by 6 blocks in a longitudinal direction.

In FIG. 4, if the vehicle is positioned at the point indicated by the self-vehicle position P and the direction of travel is an upward direction, an area R (the diagonally shaded areas in FIG. 4) corresponds to the block units as the objects for the processing of transmitting the map data. The area R include 16 blocks in all. is selected as a relatively wide area in the forward side of the travelling direction in consideration of the possibility that the vehicle passes through. The area R shown in FIG. 4 can be used for the block units as the objects even though the travelling direction is anyone of the four points of the compass.

When the transmission of the map data to the hard disc 15 is performed, it is necessary to detect the self-vehicle position P and select the block units including the self-vehicle position P as mentioned above. In this embodiment, rectangular area like a mesh is used for block units, so that it is possible to detect the block units on the basis of latitude and longitude. Further, by detecting the travelling direction, it is possible to select the area R on the basis of the block units including the self-vehicle position P. If the block map data corresponding to each of 16 block units included in the area R is not stored on the hard disc 15, the block map data is transmitted to the hard disc 15 and stored on the map data storing area 15*a* sequentially. Therefore the number of the block unit, which is actually transmitted to the hard disc 15 at the transmission for the area R, is fluctuated in accordance with the storing status of the hard disc 15.

A block area as the objects for the processing of transmitting the map data can be selected without being limited to the area R. A larger area or a smaller area can be selected as the block area, and there is the option of the figure of the area. It is desirable that he block area around the self-vehicle position P is appropriately selected in accordance with the frequency of the processing of the transmission, the size of each block, etc. The block area can be provided as an area having variable size, figure, etc., as circumstances demand without being fixed.

Figure 5:
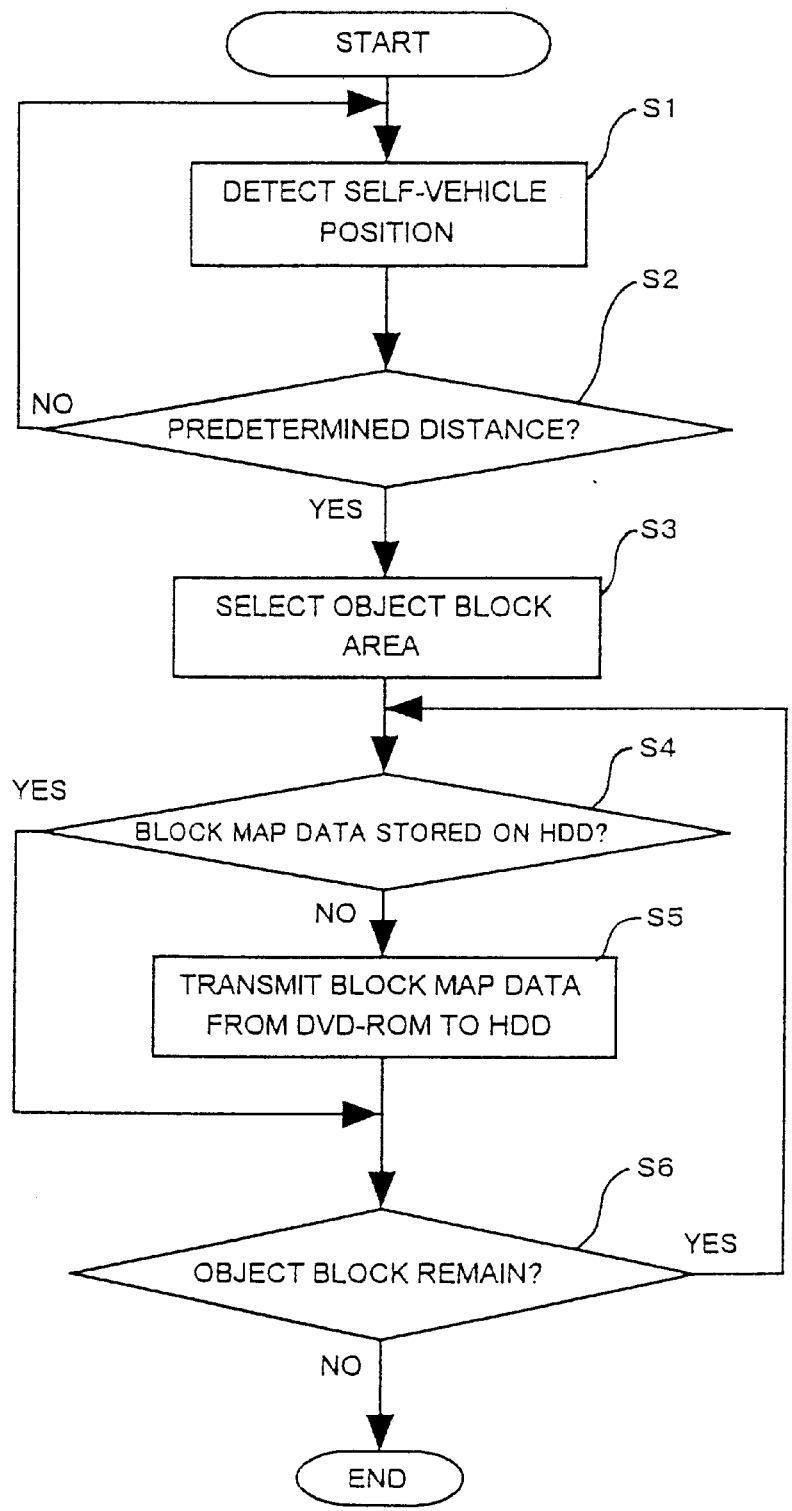
FIG. 5 is a flow chart showing the processing of the first method of transmitting the map data.

FIG. 5 is a flow chart showing the processing of the first method of transmitting. In Step S1 of FIG. 5, if the processing runs after the navigation system is started up, the self-vehicle position P is detected. Namely, the self-vehicle position data including latitude and longitude is obtained on the basis of the position data from the GPS receiver 17.

Next, in Step S2, the travelling distance from the position where the former processing is performed is obtained, and it is determined whether the obtained travelling distance exceeds the predetermined distance. Namely, although it is possible to select the execution timing of the transmitting processing in various ways, in this embodiment at the timing that the vehicle moves the predetermined distance the transmitting processing is executed. In addition, the transmitting processing can be executed every time when the vehicle moves from one block to another block. Further, the transmitting processing can be executed at the predetermined timing.

As a result of determination of the Step S2, if the travelling distance does not reach the predetermined distance (Step S2; NO), the transmitting processing is not executed yet and the processing of the Step S1 is executed. On the other hand, if the travelling distance reaches the predetermined distance (Step S2; YES), the processing of Step S3 is executed. In the Step S3, the area R corresponding to the block units as the objects for the processing of transmitting the map data is selected on the basis of the self-vehicle position data as mentioned above. Specifically, as shown in FIG. 4, the area R is selected on the basis of the block units including the self-vehicle position P and the travelling direction of the vehicle. Then 16 blocks included in the block units are specified.

In Step S4, it is determined whether the block map data corresponding to each of 16 blocks included in the area R is stored on the hard disc 15. In the map data storing area 15*a*, the block map data transmitted previously is stored on the hard disc 15 sequentially. Therefore if the name of the block is referred in rotation, it is possible to determine the presence or the absence of the predetermined block map data. Alternatively, if a management area is set on the hard disc 15, a flag indicating the presence or the absence of each the block map data can be written in the management area. Then by referring the flag, it can be determined the presence or the absence of the predetermined block map data.

As a result of the Step S4, if the block map data for objects are not stored on the hard disc 15 (Step S4; NO), the transmission processing is executed as shown in Step S5. On the other hand, if the block map data for objects are already stored on the hard disc 15 (Step S4; YES), the processing of Step S6 is executed without executing the transmission processing.

Figure 6:
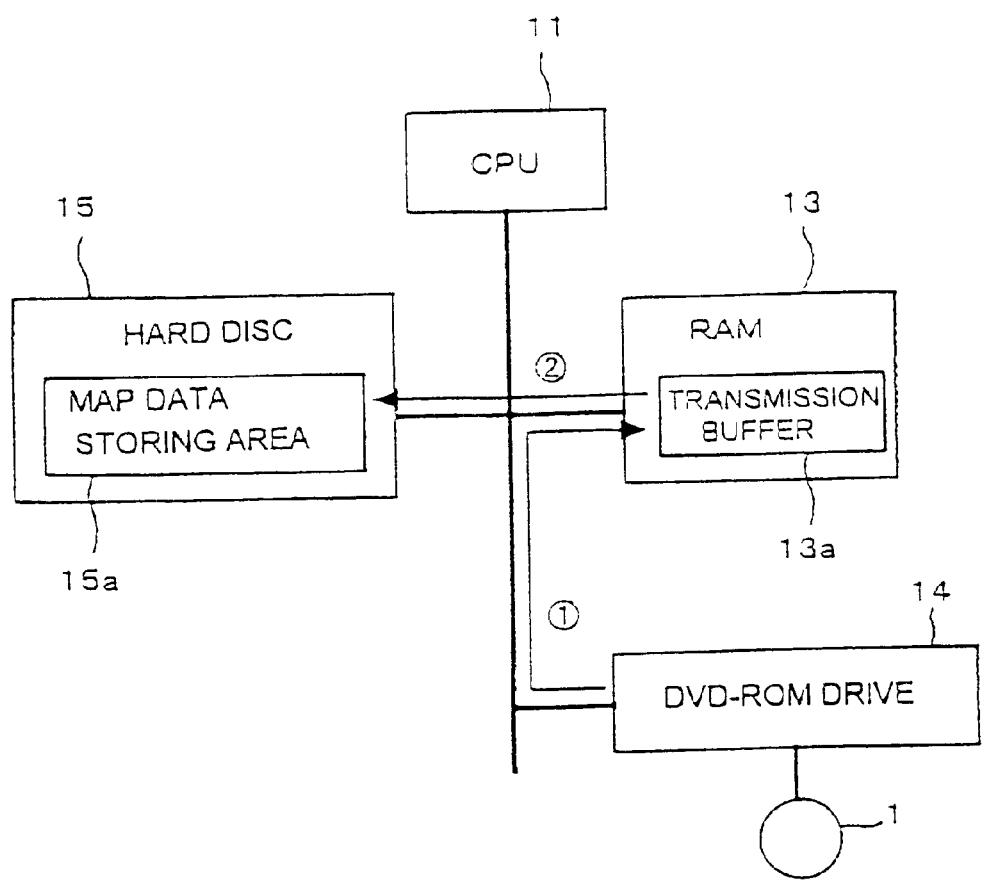
FIG. 6 is a block diagram showing the outline of transmitting the block map data from the recording medium to a storage device.

In the transmission processing of Step S5, the block map data of each block stored on the DVD-ROM is read out by the DVD-ROM drive 14, and stored on the map data storing area 15*a* of the hard disc 15. FIG. 6 is a block diagram showing the outline of transmitting the block map data from the DVD-ROM 1 to the hard disc 15. As shown in FIG. 6, after the block map data stored on the DVD-ROM 1 is read out of the DVD-ROM drive 14, it is temporarily stored on the transmission buffer 13a of the RAM 13. The transmission buffer 13a is a storing area on the RAM 13 provided for the transmission processing in this embodiment, and has the capacity that the block map data at least in one block can be stored. After that, the block map data stored on the transmission buffer 13a is written on the predetermined storing position of the map data storing area 15a.

In FIG. 6, the CPU 11 controls the timing of the transmission between the DVD-ROM driver 14 and the RAM 13, and the transmission between the RAM 13 and the hard disc 15. The RAM 13 may store the block map data of the block units around the vehicle for the display processing in the display controller 21 as mentioned later. If it stores the block map data, it is possible to transmit the block map data directly from the RAM 13 to the hard disc 15 without reading the DVD-ROM 1.

In Step S6, it is determined whether any block unit for the object exists in the area R yet. As a result, if the block unit for the object remains in the area R (Step S6; YES), the transmission processing shown in the Steps S4 to S6 is executed for the block. On the other hand, if all of the 16 blocks in the area R has already been transmitted (Step S6; No), the processing is exited.

FIGS. 7 to 9 are diagrams showing the relationship between the movement of the position of the vehicle and the storing status of the hard disc 15. The transition of the storing status of the block map data on the map data storing area 15a of each hard disc 15 will be explained in the order of FIG. 7, FIG. 8, and FIG. 8 if the self-vehicle position is varied.

Figure 7A:
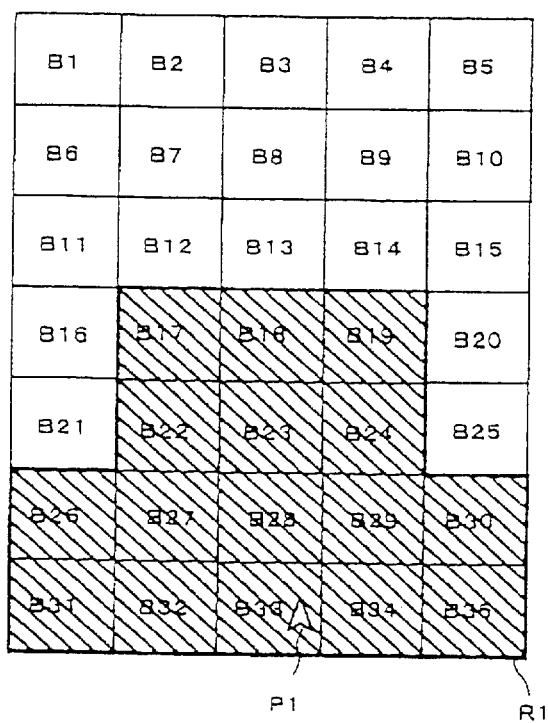
FIG. 7A is a diagram showing the status of the peripheral blocks when a vehicle is positioned at the self-vehicle positioned.
Figure 7B:
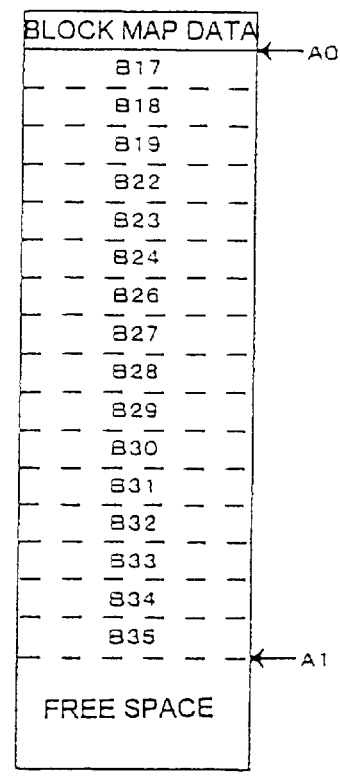
FIG. 7B is a diagram showing the assignment of the block map data stored on the map data storing area of the storage device.

FIG. 7A is a diagram showing the status of the peripheral blocks when the vehicle is positioned at the self-vehicle positioned P1. FIG. 7B is a diagram showing the assignment of the block map data stored on the map data storing area 15a of the hard disc 15 corresponding to FIG. 7A. In FIG. 7A, for the sake of simplicity, it is assumed that 35 blocks area of 7 blocks in the longitudinal direction by 5 blocks in the lateral direction are used for the objects. In FIG. 7A, all blocks are indicated as a block B1 to a block B35 starting from the left.

As shown in FIG. 7A, the self-vehicle position P is included in a block B33. Therefore a block area as well as the area R shown in FIG. 4 is selected on the basis of the block B33 and determined as an area R1. Then the transmission processing in the Steps S4 to S6 of FIG. 5 is executed for 16 blocks indicated in the area R1 as the objects. At this stage, no block map data is stored on the map data storing area 15a yet.

Accordingly, as shown in FIG. 7B, the block map data of 16 blocks in the area R1 read from the DVD-ROM 1 is written on the map data storing area 15a sequentially through the transmission buffer 13a of the RAM 13. The block map data is written from the head recording position A0 of the map data storing area 15a. Then the map data of a block B17 to a block B35 is stored on an area up to a recording position A1 in the order shown in FIG. 7B. However, the order of writing 16 blocks in the area R1 can be selected in the appropriate manner.

FIG. 8A is a diagram showing the status of the peripheral blocks when the vehicle move form the self-vehicle position P1 to the self-vehicle position P2. FIG. 8B is a diagram showing the assignment of the block map data stored on the map data storing area 15a of the hard disc 15 corresponding to FIG. 8A. In this explanation, it is assumed that the determination in Step S2 of FIG. 5 leads to "YES".

As shown in FIG. 8A, the self-vehicle position P is included in a block B23. Therefore a block area is selected on the basis of the block B23 as mentioned above and determined as an area R2. Then the transmission processing in the Steps S4 to S6 of FIG. 5 is executed for 16 blocks indicated in the area R2 as the objects. At this stage, it is determined that 6 blocks of B17, B18, B19, B22, B23, and B24 are already transmitted to the hard disc 15 in accordance with the storing status of the hard disc 15. The determination in Step S4 of FIG. 5 leads to "YES". Therefore the number of the blocks transmitted actually becomes other 10 blocks.

As shown in FIG. 8B, the block map data of 10 blocks in the area R2 read from the DVD-ROM 1 is written from the recording position A1 which is the head portion of free space in the map data storing area 15a shown in FIG. 7B. Then the block map data of a block B7 to a block B25 is stored on an area up to a recording position A2 in the order shown in FIG. 8B.

FIG. 9A is a diagram showing the status of the peripheral blocks when the vehicle move form the self-vehicle position P2 to the self-vehicle position P3. FIG. 9B is a diagram showing the assignment of the block map data stored on the map data storing area 15a of the hard disc 15 corresponding to FIG. 9A. In this explanation, it is assumed that the determination in Step S2 of FIG. 5 leads to "YES" when the vehicle reaches the self-vehicle position P3.

As shown in FIG. 9A, the self-vehicle position P3 is included in a block B13. Therefore a block area is selected on the basis of the block B13 as mentioned above and determined as an area R3. Part of the area R3 is out of an area shown in FIG. 9A. Then the transmission processing in the Steps S4 to S6 of FIG. 5 is executed for 16 blocks indicated in the area R3 as the objects. At this stage, it is determined that 6 blocks of B7, B8, B9, B12, B13, and B14 are already transmitted to the hard disc 15 in accordance with the storing status of the hard disc 15. The determination in Step S4 of FIG. 5 leads to "YES". Therefore the number of the blocks transmitted actually becomes other 7 blocks as far as the shown area in FIG. 9A is concerned.

As shown in FIG. 9B, the block map data of 7 blocks in the area R3 read from the DVD-ROM 1 is written from the recording position A2 which is the head portion of free space in the map data storing area 15a shown in FIG. 8B. Then the block map data of a block B2 to a block B15 is newly stored on an area up to a recording position A3 in the order shown in FIG. 9B.

After that, the same processing is repeatedly executed every time when the determination in Step S2 of FIG. 5 leads to "YES" by the movement of the self-vehicle position. Consequently, new block data is stored on the map data storing area 15a in sequence. If free space assigned for the map data storing area 15a becomes full and no new block map data can not be stored on the map data storing area 15a, stored block map data can be deleted in accordance with the predetermined conditions. For example, block map data whose date of storing to the hard disc 15 is the oldest one can be deleted. Alternatively, block map data whose distance from the self-vehicle position is farthest one can be deleted. As a result, it is possible to write new block map data to the map data storing area 15a.

In accordance with the navigation system using the first method of this embodiment, the self-vehicle position is detected, and the present block the self-vehicle position belongs to is selected. Then the processing of transmitting the block map data from the DVD-ROM 1 to the hard disc 15 is executed for a plurality of blocks around the self-vehicle position as the objects of the transmission. Then it is determined the storing status of the map data storing area 15a of the hard disc 15, and block map data which is not stored yet is transmitted to the hard disc 15. Consequently, it is possible to selectively store block map data around the self-vehicle having high possibility of use on the hard disc 15. If block map data already stored on the hard disc 15 is used for the transmission, it is possible to use the DVD-ROM drive 14 for other applications. Alternatively, if the DVD-ROM 1 is ejected, the navigation operation can be continued to execute. Blocks where the vehicle passes frequently have higher possibility that they are stored on the hard disc 15 than other blocks, so that utility value of map data stored on the hard disc 15 becomes higher. Generally, it is possible to cover a travelling area of the specific vehicle even if the capacity of the map data storing area 15a is comparatively small, so that the other storing areas can be used for the other applications.

Figure 10:
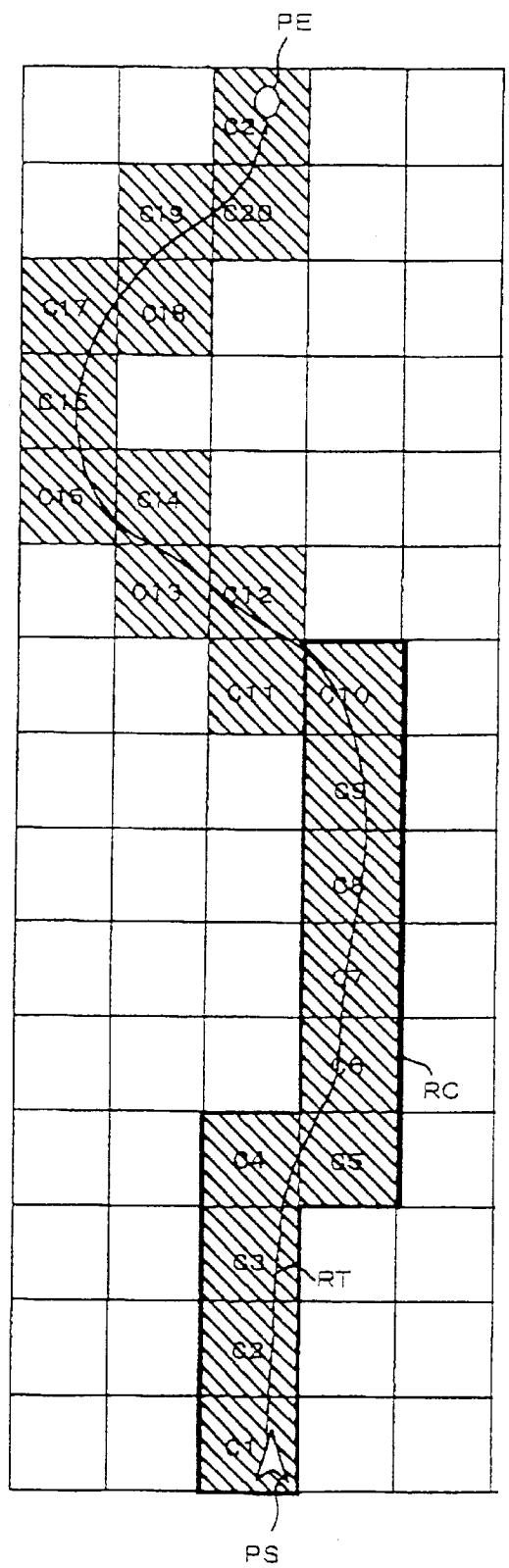
FIG. 10 is a diagram showing block area for objects of the transmission in second method of the present invention.

Next, the second method of transmitting on the embodiment will be explained with reference to FIGS. 10 to 11. FIG. 10 is a diagram showing block area for objects of the transmission in the method. For the sake of simplicity, it is assumed that 75 blocks area of 5 blocks in the lateral direction by 15 blocks in the longitudinal direction, viewed from the vehicle position. In FIG. 10, the vehicle is positioned at the self-vehicle position P and the travelling direction is upward.

In the second method of transmitting, an area overlapped with an optimum route set in the navigation system is set for the block area for the objects. Namely, in FIG. 10, an optimum route is obtained between a start position PS and a destination PE on the basis of the desirable operation, and the optimum route is set for the optimum route RT. The 21 blocks from a block C1 including a starting position PS to a block C21 including a destination PE via blocks C2 to C20 on the way along the optimum route RT are overlapped with the optimum route RT.

If the number of the blocks on the optimum route RT may become large, to restrict processing time necessary for the transmission, the number of blocks which are objects for one transmission processing to the hard disc 15 is restricted to the predetermined number. For example, in FIG. 10, the number of the blocks which are objects for one transmission processing is restricted to 10 blocks. In this case, an area RC at the self-vehicle position becomes the objection of the transmission processing. As shown in FIG. 10, the area RC includes 10 blocks in all from a block C1 to a block C10. As is the case with the first method, the block map data corresponding to each block in the area RC is sequentially stored on the map data storing area 15a of the hard disc 15.

Figure 11:
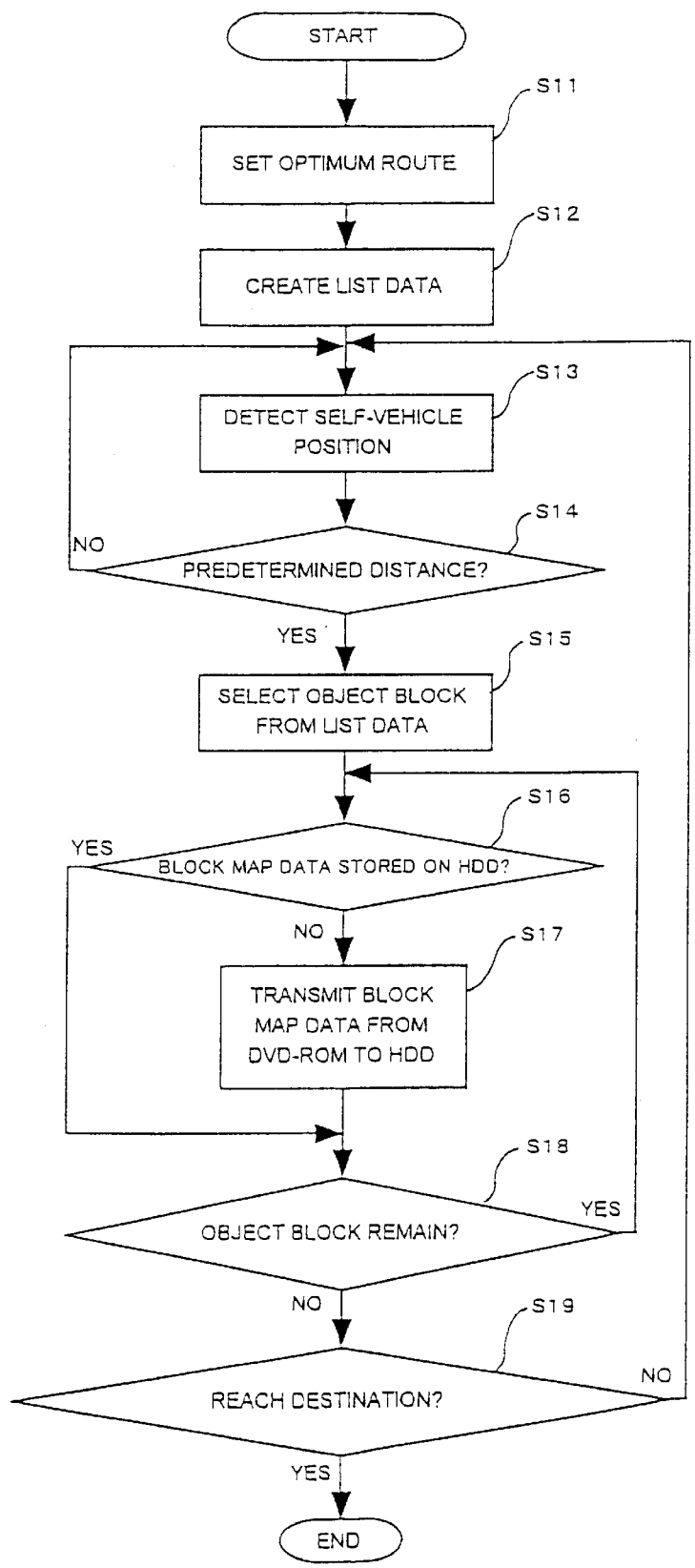
FIG. 11 is a flow chart showing the processing of the second method of transmitting the map data.

FIG. 11 is a flow chart showing the processing of the second method of transmitting. In FIG. 11, after the navigation is started up, the optimum route RT to the desirable destination is set in accordance with operation by a user, etc., in Step S11.

In Step S12, blocks overlapped with the optimum route RT set in the Step S11 are selected, and list data of the selected blocks is made in the order from the starting position PS to the destination PE. The list data is stored, for example, on the predetermined area of the RAM 13. In the example of FIG. 10, list data is made in the order from a block C1 to a block C21. Not only blocks overlapped with the optimum route RT but also blocks including ones around the optimum route RT are set as blocks for the objects of transmitting.

Subsequently, the self-vehicle position is detected in Step S13, and it is determined whether the vehicle moves the predetermined distance in Step S14. Those Steps S13 and S14 are executed as is the case with the Steps S1 and S2. However, after the optimum route RT is set, only in case that the processing of the Step S14 is executed at first, the predetermined distance can be set as zero. In this case, the result of the determination in the Step S14 becomes "YES", so that the transmission processing of Steps S15 to S19 can be executed immediately.

If the result of determination in the Step S14 is "YES", the area RC for the objects of the transmission is selected by referring the list data in the Step S15. In the example of FIG. 10, ten blocks from a block C1 including the self-vehicle position to a block C10 are set as the area RC.

In Steps S16 to S18, the processing of transmitting the block map data corresponding to each block in the area RT selected in the Step S15 to the map data storing area 15a of the hard disc 15 is executed. The processing of the Steps S16 to S18 can be executed as is the case with the processing in the Step S4 to S6 of FIG. 5.

If the result of the determination in Step S18 is "NO", the transmission processing is exited once. Then in Step S19 it is determined whether the vehicle reached the destination PE (Step S19). As a result, if the vehicle does not reach the destination PE (Step S19; NO), the processing of the Step S13 is executed for the next transmission processing. On the other hand, if the vehicle reaches the destination PE (Step S19; YES), the processing is exited.

It is conceivable that the vehicle goes out of the optimum route while travelling. Therefore if it is determined that a block including the self-vehicle position is out of the optimum route RT as result of the determined of the Step S13, the optimum route from the present self-vehicle position to the destination PE is newly obtained, and list data corresponding to the new optimum route is newly made. Then it is desirable that the processing of the Steps S13 to S19 is executed again.

In the navigation system using the second method of transmitting, if an optimum route RT is set, a plurality of blocks overlapped with the optimum route RT are set for the objects of transmitting. Then the processing of transmitting the block map data in the blocks for the objects from DVD-ROM 1 to the hard disc 15 as is the case with the first method. Therefore, in addition to the effect of the first method of transmitting, it is possible to transmit the map data along the optimum route RT, which has high possibility that the vehicle passes while travelling, to the hard disc 15 in advance. Consequently, it is possible to store the map data having high utility value on the hard disc 15.

Figure 12:
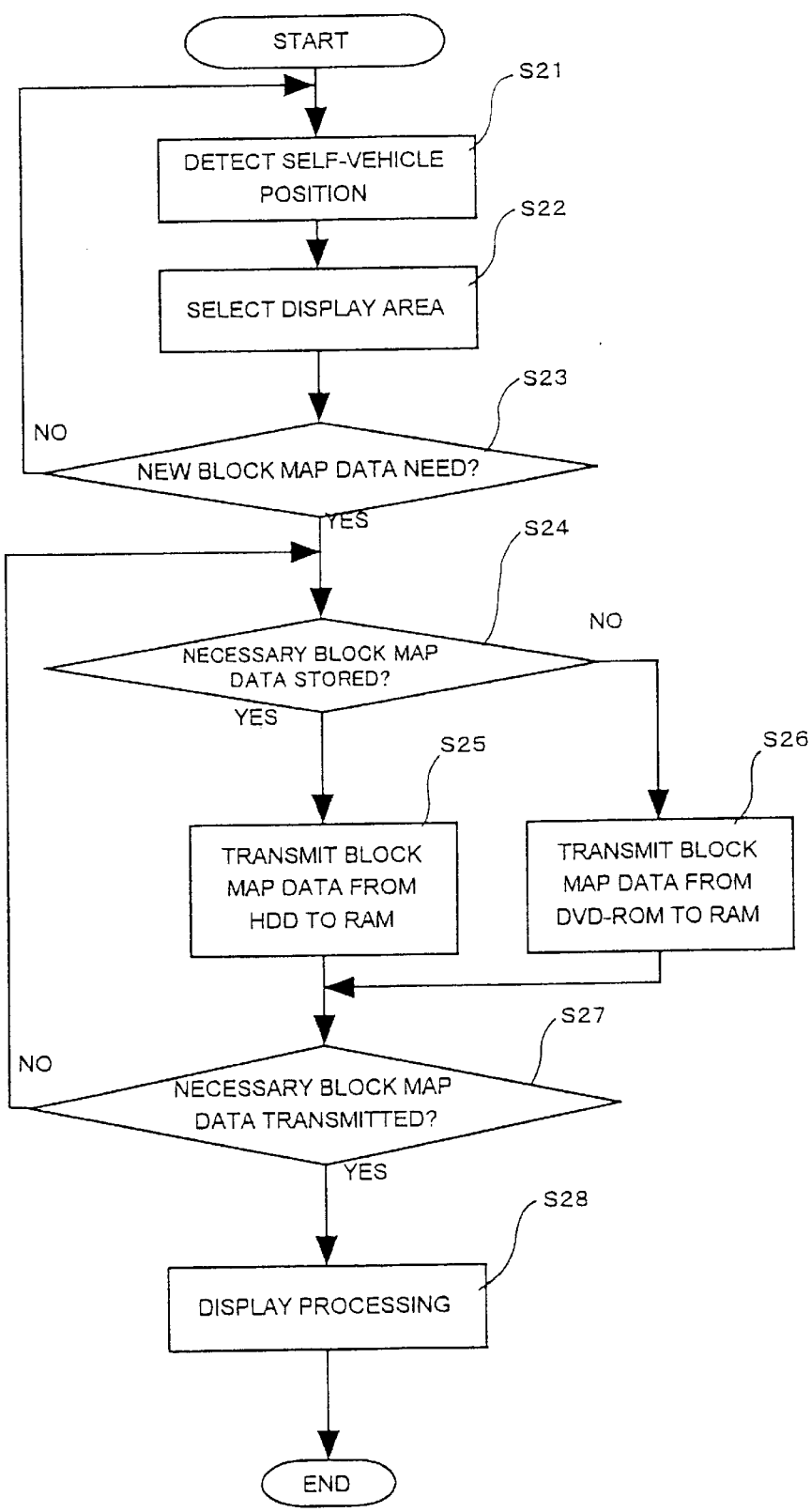
FIG. 12 is a flow chart showing display processing for a screen on the basis of the map data.
Figure 14:
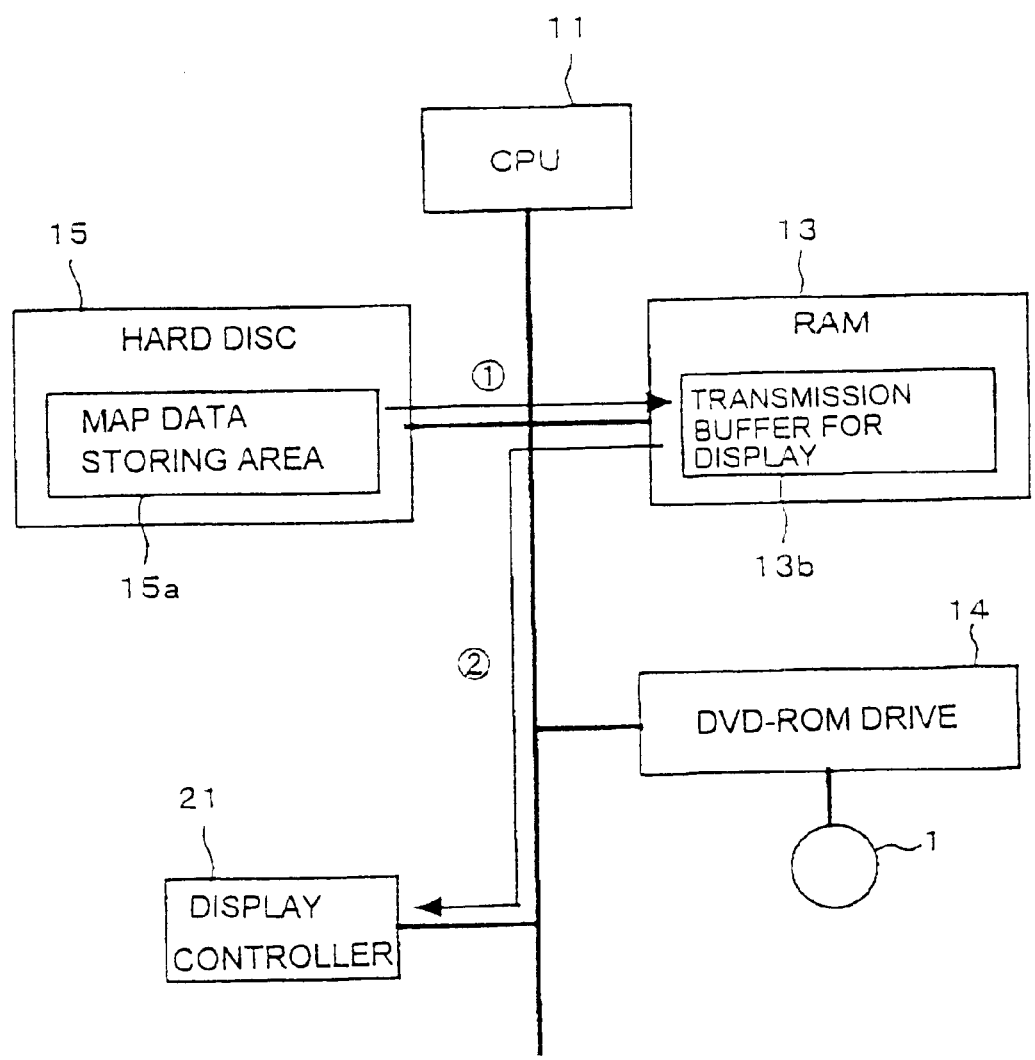
FIG. 14 is a diagram showing the transmission of the block map data in a display processing (No. 1)
Figure 15:
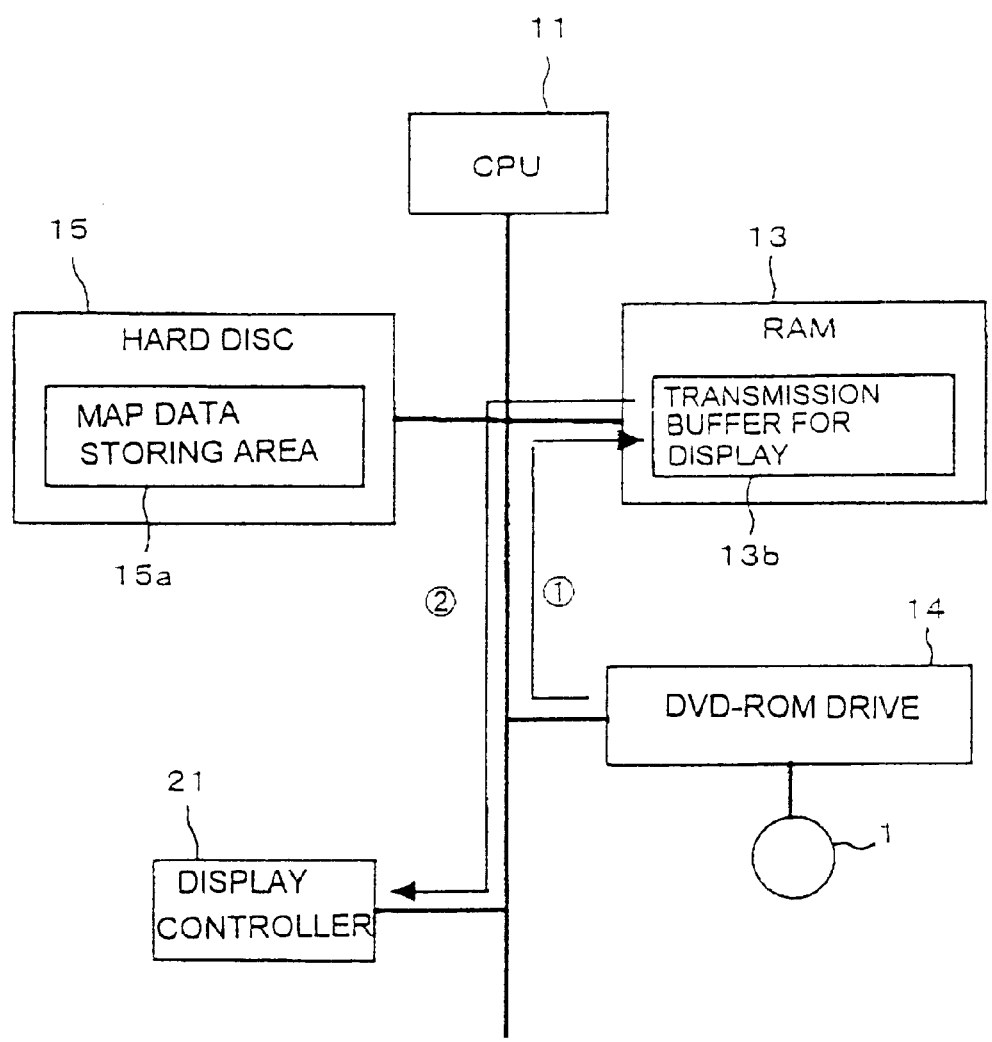
FIG. 15 is a diagram showing the transmission of the block map data in a display processing (No. 2)

Next, display processing for a screen on the basis of the map data will be explained with reference to FIGS. 12 to 15. FIG. 12 is a flow chart showing display processing for a screen on the basis of the map data:. FIG. 13 is a diagram showing a display range corresponding to the self-vehicle position. FIGS. 14 and 15 are diagrams showing the transmission of the block map data in the display processing. It is assumed that all of the block map data of the whole map, for example, a map of all over Japan, are stored on the DVD-ROM 1, and part of the block map data is stored on the hard disc 15.

In FIG. 12, after the display processing is started up, the self-vehicle position is detected in the processing of the Step S21. Then a display area on the map for the object of transmitting is selected on the basis of the self-vehicle position in Step S22.

The display area selected in the Step S22 will be explained with reference to the FIG. 13. In FIG. 13, blocks around the self-vehicle position are arranged as is the case with FIGS. 7 to 9. A display area D1 when the vehicle is positioned at the self-vehicle position P4 and a display area D2 when the vehicle is positioned at the self-vehicle position P5 are described respectively by the dotted lines in FIG. 13. The display areas D1, D2 are set as a little larger rectangular area than the size of each block. Roads, etc., in the display area D1, D2 are displayed on the display 20. However, a figure of the display area D1, D2 in FIG. 13 is one example, and can be set as a larger one or a smaller one in practice.

In FIG. 13, the display area D1 is overlapped with blocks B23, B24, B28, and B29, so that block map data of the 4 blocks is necessary for the display processing. The display area D2 is overlapped with blocks B12, B13, B14, B17, B18, and B19, so that block map data of the 6 blocks is necessary for the display processing. In this manner, in the Step S22, a display area can be selected in accordance with the movement of the vehicle, and blocks as the objects of displaying can be selected on the basis of the selected display area.

In Step S23, in advance of the transmission of necessary block map data to the RAM 13, it is determined whether new block map data corresponding to the blocks selected for the objects of displaying in the Step S22 is necessary. Namely, the block map data necessary for the display processing is transmitted from the hard disc 15 or the. DVD-ROM drive 14 to the display controller 21 via the transmission buffer 13*b* for display as shown in FIGS. 14 and 15. Therefore in the Step S23 it is determined whether the necessary block map data has already stored on the transmission buffer 13*b* for display.

As a result of the determination in the Step S23, if the new block map data to be transmitted to the transmission buffer 13*b* for display is necessary (Step S23; YES), the processing of Step S24 is executed. On the other hand, the new block map data is not necessary because the necessary block map data has already stored on the transmission buffer 13*b* for display (Step S23; NO), the processing of Step S21 is executed.

In Step S24, it is determined whether block map data determined as necessary data in Step S23 has already stored on the map data storing area 15*a* of the hard disc 15 (Step S24). This determination can be performed as is the case with Step S4 of FIG. 5. As a result of Step S24, it has already stored on the map data storing area 15*a* (Step S24; YES), the processing of Step S25 is executed. If it has not stored on the map data storing area 15*a* yet (Step S24; NO), the processing of Step S26 is executed.

In Step S25, the transmission processing of the block map data from the hard disc 15 to the RAM 13 is executed. As shown in FIG. 14, under the control of the CPU 11, the necessary block map data is read from the map data storing area 15*a* of the hard disc 15, and the necessary block map data is written on the transmission buffer 13*b* for display of the RAM 13. After that, the block map data is stored on the transmission buffer 13*b* for display until it is used for the display processing in the display controller 21 as mentioned later.

On the other hand, in Step S26, the transmission processing of the block map data from the DVD-ROM drive 14 to the RAM 13 is executed. As shown in FIG. 15, under the control of the CPU 11, the DVD-ROM drive 14 reads the necessary block map data from the DVD-ROM 1, and writes it on the transmission buffer 13*b* for display of the RAM 13. After that, the block map data is stored on the transmission buffer 13*b* for display until it is used for the display processing in the display controller 21 as mentioned later.

Subsequently to the Step S25 or Step S26, in Step S27, it is determined whether all of the block map data which is determined as necessary data in the Step S23 have been already transmitted to the RAM 13. As a result of the determination, if all of the block map data have been transmitted to the RAM 13 (Step S27; YES), the processing of Step S28 is executed. If the block map data to be transmitted remains yet (Step S27; NO), the processing on and after the Step S24 is executed.

In Step S28, the display processing is executed by using the block map data stored on the RAM 13. Namely, as shown in FIG. 14 and 15, the block map data necessary for the display processing is sequentially read from the transmission buffer 13*b* for display of the RAM 13, and outputted to the display controller 21. Then the display processing is executed. As a result, a display necessary for the navigation operation is displayed on the screen of the display 20.

In accordance with the display processing of this embodiment, if the DVD-ROM 1 storing the map data is not loaded in the DVD-ROM drive 14, it is possible to execute the display processing necessary for the navigation processing when the map data has been already stored on the hard disc 15. A display speed is faster than the conventional navigation system because there is more chance that the map data is read from the hard disc 15 having a quick access time, so that executing speed of a scroll, etc., becomes faster. Therefore the usability of the navigation system is improved.

In the above-mentioned embodiment, the DVD-ROM 1 is used for a recording medium storing the map data. However, a recording format to the recording medium is not limited to the DVD format. The recording medium is not limited to an optical disc, etc. The present invention can be applied for a system in which the map data is downloaded through a network, for example.

The navigation system can be provided not only as an individual navigation device but also a system using a personal computer which has a hard disc, for example. In this case, the software executing the transmission processing of the present invention is run on the personal computer, so that the function of the present invention can be implemented.

Instead of using the recording medium storing the map data, such as the DVD-ROM, etc., the block map data can be transmitted and obtained from a map server installed in an external center where map data is managed. In this case, a cellular phone is used in the vehicle. The block map data to be transmitted to the hard disc 15 of the navigation device installed in the vehicle is determined by using the same method as the above-mentioned embodiment. Then a connection between the navigation device and the center is established by using the cellular phone, a request for the block map data is transmitted to the center. Consequently, the block map data is downloaded to the navigation device. In this manner, the recording medium having an exclusive use of reproduction and storing the map data becomes unnecessary.

[II] Second Embodiment

Next, the second embodiment of the present invention will be explained with reference to FIGS. 16 to 25.

Figure 16:
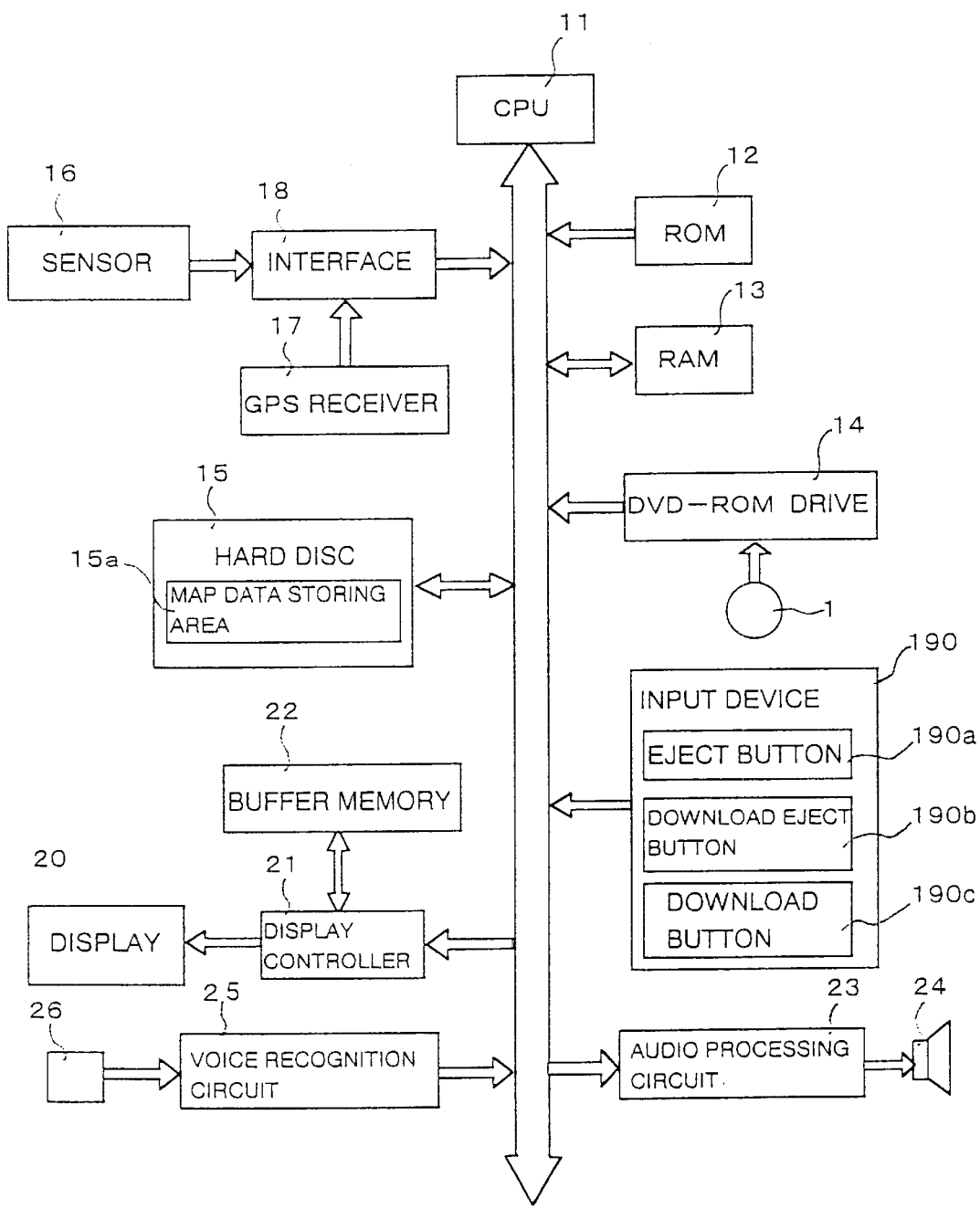
FIG. 16 is a block diagram showing the entire construction of the navigation system of the second embodiment.

FIG. 16 is a block diagram showing the entire construction of the navigation system of the second embodiment. As shown in FIG. 16, the navigation system of the second embodiment is provided with common elements with the navigation system of the first embodiment shown in FIG. 1, except for an input device 190, a voice recognition circuit 25, a microphone 26. Further the controlling program stored on the ROM 12 is different from that of the first embodiment. Moreover, an eject motor (not shown in FIG. 16) is installed in the DVD-ROM drive 14, so that it is possible to eject the DVD-ROM 1 by an operation as mentioned later. Explanations for the common elements with the first embodiment are omitted in the following explanation.

The input device 190 is comprised of some elements, such as various keys and buttons for desirable operations in the navigation operation. The keys and buttons are installed in a main body of the navigation system or an external remote control unit. If each of keys and buttons is pressed, a corresponding signal is outputted to the CPU 11. Moreover, the input device 190 is provided with an eject button 190*a* to eject the loaded DVD-ROM 1 from the DVD-ROM drive 14, a download-eject button 190*b* to indicate the instruction of downloading the map data stored on the DVD-ROM 1 to the hard disc 15 at the time of ejection, a download button 190*c* to indicate the instruction of downloading the map data stored on the DVD-ROM 1 to the hard disc 15. The eject button 190*a*, the download-eject button 190*b*, and the download button 190*c* can be implemented by displaying the buttons as part of a display menu on the display 20. In this case, by using an external remote control unit or a touch panel, various operations are executed. Alternatively, it is possible to use voice instructions recognized by the voice recognition circuit 25.

Various messages to be notified for a user are displayed on the display 20 when the DVD-ROM 1 is ejected while the navigation operation is executed.

The voice processing circuit 25 also outputs various guide message when the DVD-ROM 1 is ejected while the navigation operation is executed.

The voice recognition circuit 25 recognizes a voice inputted from the, microphone 26 under the control of the CPU 11. An instruction provided as a voice by a user for the navigation system is inputted through the microphone 26. Then the instruction is analyzed and recognized as an operation command to the navigation system by the CPU 11.

Furthermore, reading and transmitting the map data necessary for the navigation operation is executed by pressing each of the buttons, the eject button 190*a*, the download-eject button 190*b*, and the download button 190*c*.

Next, the transmission processing of the navigation system in the second embodiment will be explained with reference to FIGS. 17 to 24. Three processing corresponding to three buttons will be explained by turns.

(1) The Processing at the Pressing the Eject Button 19*a*

The processing executed under the condition that the eject button 19*a* is pressed when the DVD-ROM 1 is loaded in the DVD-ROM drive 14 will be explained with reference to FIGS. 17 to 22.

Figure 17:
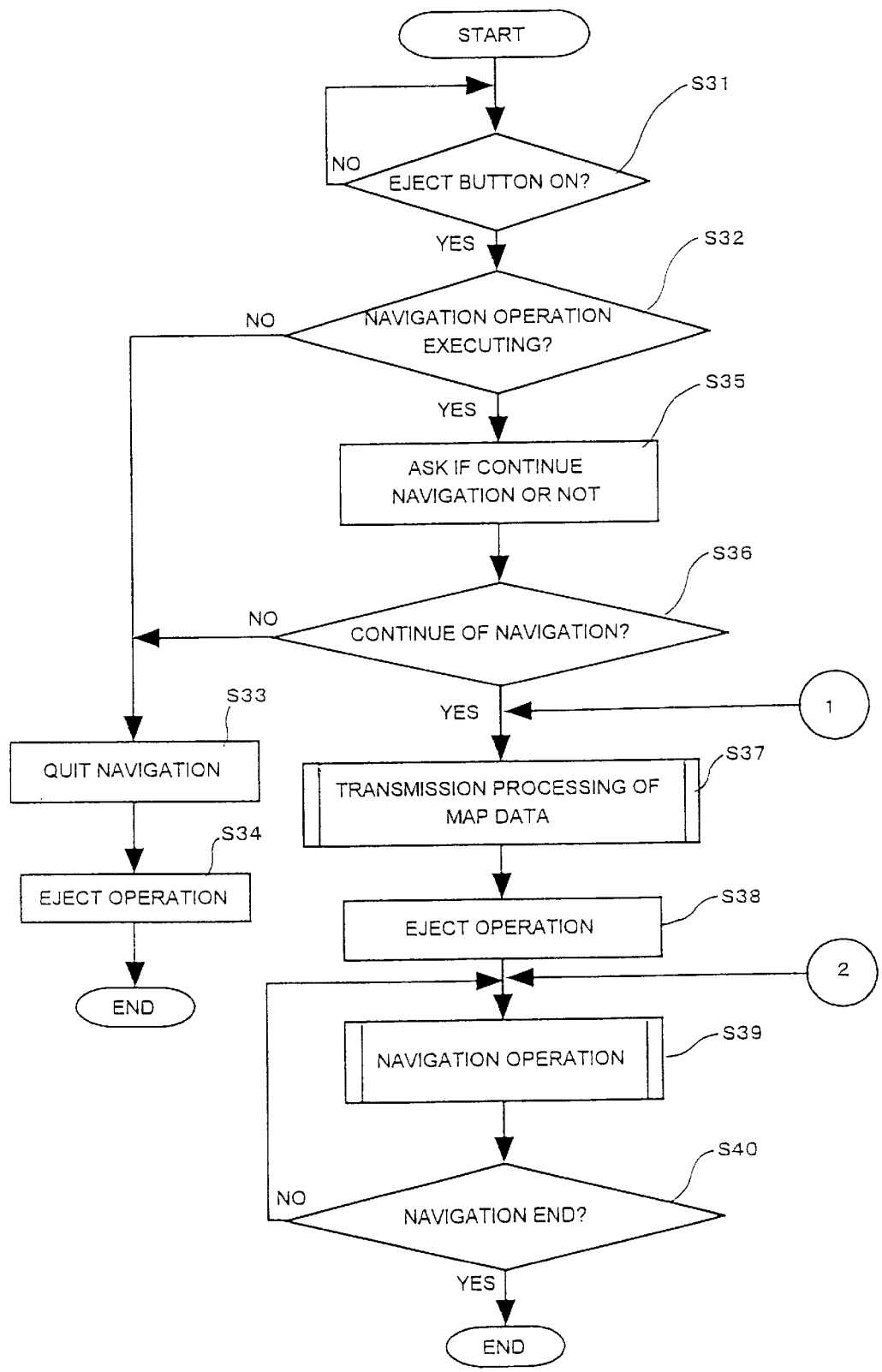
FIG. 17 is a flow chart showing the entire flow of the transmission processing.

FIG. 17 is a flow chart showing the entire flow of the transmission processing. In FIG. 4, it is determined whether the eject button 190*a* is pressed by watching a detecting signal from the input device 190 in Step S31. As a result of the determination, if the eject button 190*a* is not pressed (Step S31; NO), watching the detecting signal is continued. If the eject button is pressed (Step S31; YES), the processing of Step S32 is executed.

In Step S32, it is determined whether the navigation operation is executed. The map data used for the navigation operation is the object for the transmission processing of this embodiment. If the navigation operation is not executed, it is unnecessary to execute the transmission processing.

Therefore the determination in the Step S32 is executed in advance to prevent the unnecessary transmission. As a result of the determination, if the navigation operation is not executed (Step S32; NO), the processing of Step S33 is executed. If the navigation operation is executed (Step S32; YES), the processing of Step S35 is executed.

In Step S33 the executing navigation operation is quit. Then an ejecting operation by the DVD-ROM drive 14 is immediately executed. Therefore the DVD-ROM 1 is ejected out of the DVD-ROM drive 14, it is possible to load a new disc.

On the other hand, in Step S35 the predetermined message for selecting continuing or quitting the executing navigation operation is displayed on the display 20. Then the similar message is outputted by voice from the speaker 24. For example, a message, such as "QUIT NAVIGATION? Or, TRANSMIT DATA OF DISC TO HARD DISC AND CONTINUE NAVIGATION?", is displayed, and the other message for inducing the predetermined selecting operation can be added to that.

Subsequently, in Step S36, by watching the detecting signal from the input device 190, it is determined whether continuing of the navigation operation is instructed through the predetermined operation in accordance with the above-mentioned message. As a result of the determination, if quitting the navigation operation is instructed instead of continuing (Step S36; NO), the processing of the Step S33 is executed, so that the navigation operation is quit, and the DVD-ROM is ejected.

On the other hand, as a result of the determination of the Step S36, if continuing the navigation operation is instructed (Step S36; YES), the transmission processing the map data to the hard disc 15 is executed in Step S37.

Figure 18:
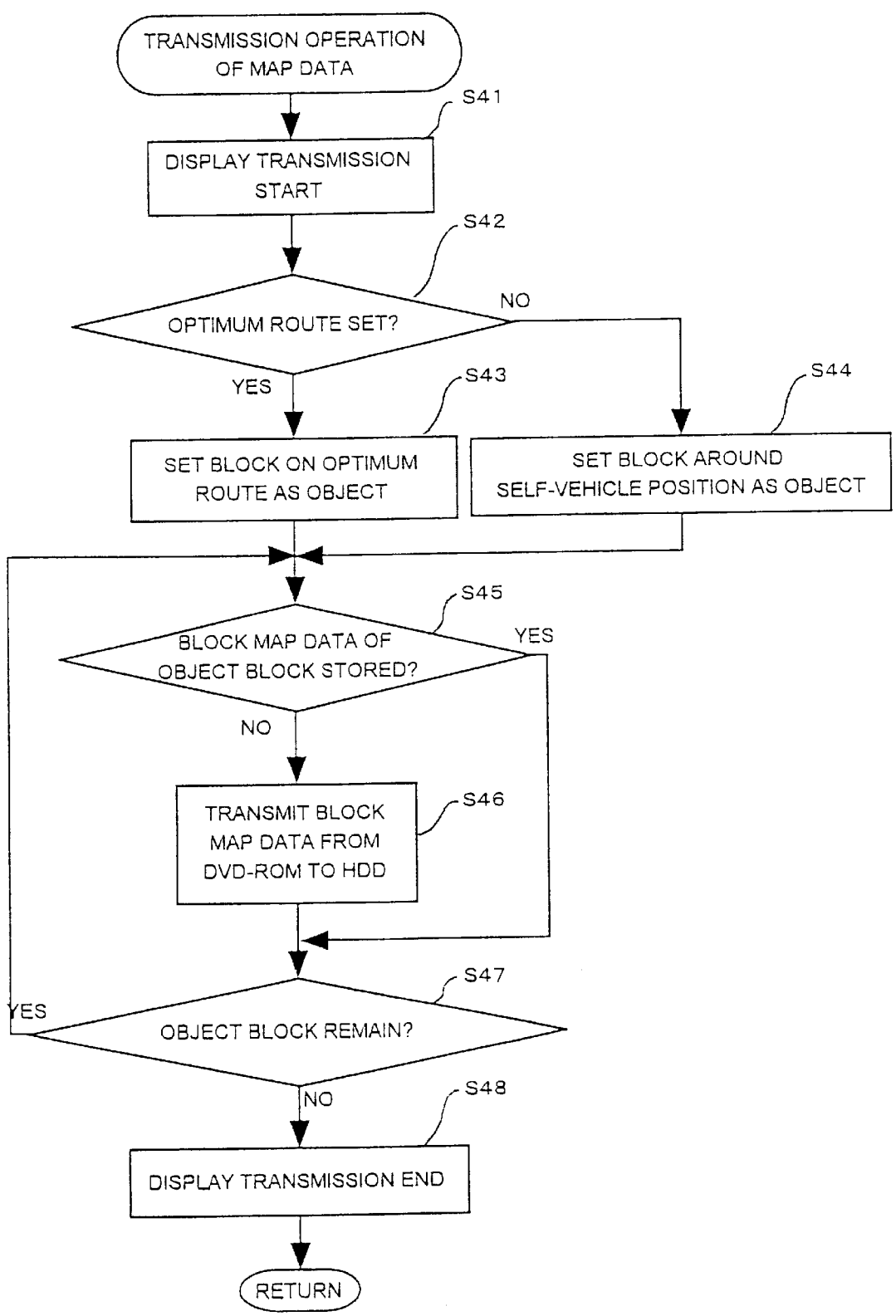
FIG. 18 is a flow chart showing the transmission processing of the map data of the second embodiment.

The transmission processing of the Step S7 will be explained in detail with reference to a flow chart of FIG. 18. After the processing is started, in Step S41, a message indicating a start of the transmission is displayed on the display 20. Therefore a user can understand that it is necessary to wait the ejecting operation of the DVD-ROM 1.

Next, in Step S42, it is determined whether an optimum route to a desirable destination is set in the navigation system. It is possible to set the optimum route in advance in order to make the user understand the route to the desirable destination in the navigation system. As a result of the Step S42, if the optimum route is set (Step S42; YES), the processing of Step 43 is executed. If the optimum route is not set (Step S42; NO), the processing of Step S44 is executed.

In this embodiment, a block area is selected in accordance with the self-vehicle position to transmit the effective map data having a high possibility of use and reduce the transmitted amount of the map data in a certain degree. There are two ways to select the block area. The processing of Step S43 corresponds to the way to select the block area along the optimum route as the object of transmitting. The processing of Step S44 corresponds to the way to select the block area around the self-vehicle position as the object of transmitting.

Figure 19:
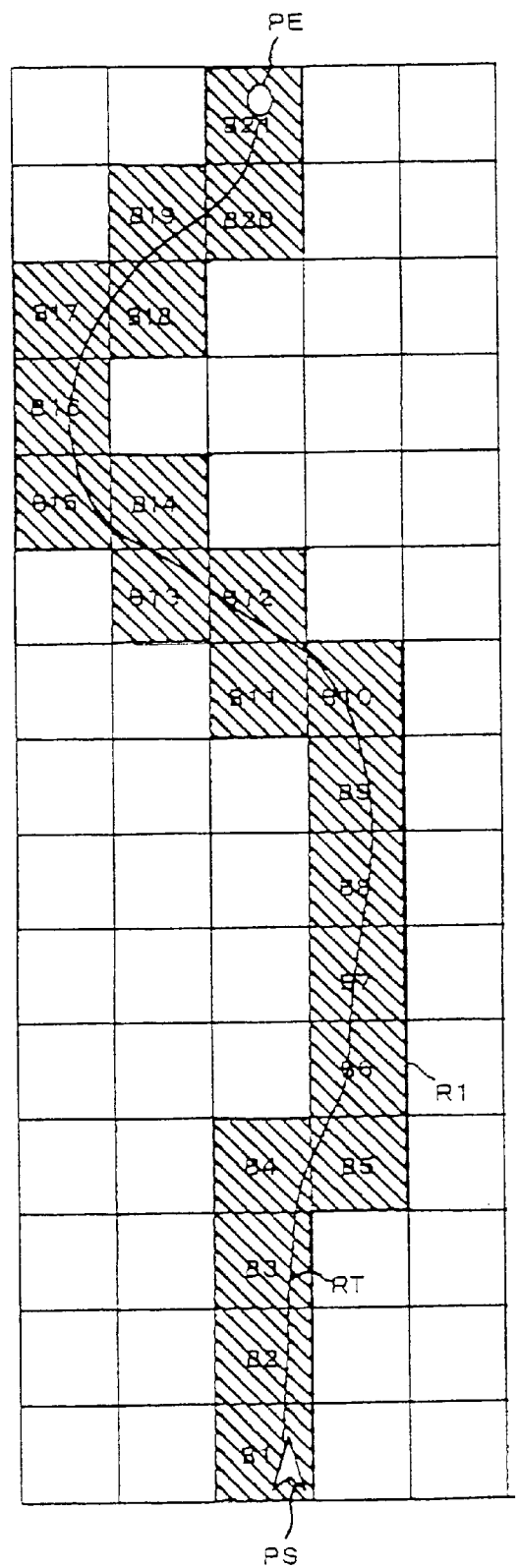
FIG. 19 is a diagram showing a example of the block area for the object of transmitting (No. 1)

FIG. 19 is a diagram showing a example of the block area for the object of transmitting. For the sake of simplicity, it is assumed that the block area of 75 blocks in all of 5 blocks in a lateral direction by 15 blocks in a longitudinal direction when viewed from the vehicle position.

As shown in FIG. 19, an area overlapped with the optimum route RT set in the navigation system is set as the block area R1 for the object of transmitting in the Step S43. The optimum route RT is obtained between a start position PS and a destination PE on the basis of the desirable operation. If the optimum route RT is set, the block area comprising 21 blocks from a block B1 including a starting position PS to a block B21 including a destination PE via blocks B2 to B19 on the way along the optimum route RT is included in the block area R1. As mentioned above, rectangular area like a mesh is used for block area, so that it is possible to detect block units overlapped with the optimum route RT and select the block area R1 on the basis of latitude and longitude of each point on the optimum route.

The number of block units overlapped with the optimum route RT can be more than 21 block units. A block area including all of the block units can be set as the block area R1. In this case, the longer optimum route RT is set because the destination PE is in the distance, the more block units are included in the block area R1. Therefore the time necessary for the transmission processing becomes longer. The block area R1 can be set except for block units the vehicle already passed.

Figure 20:
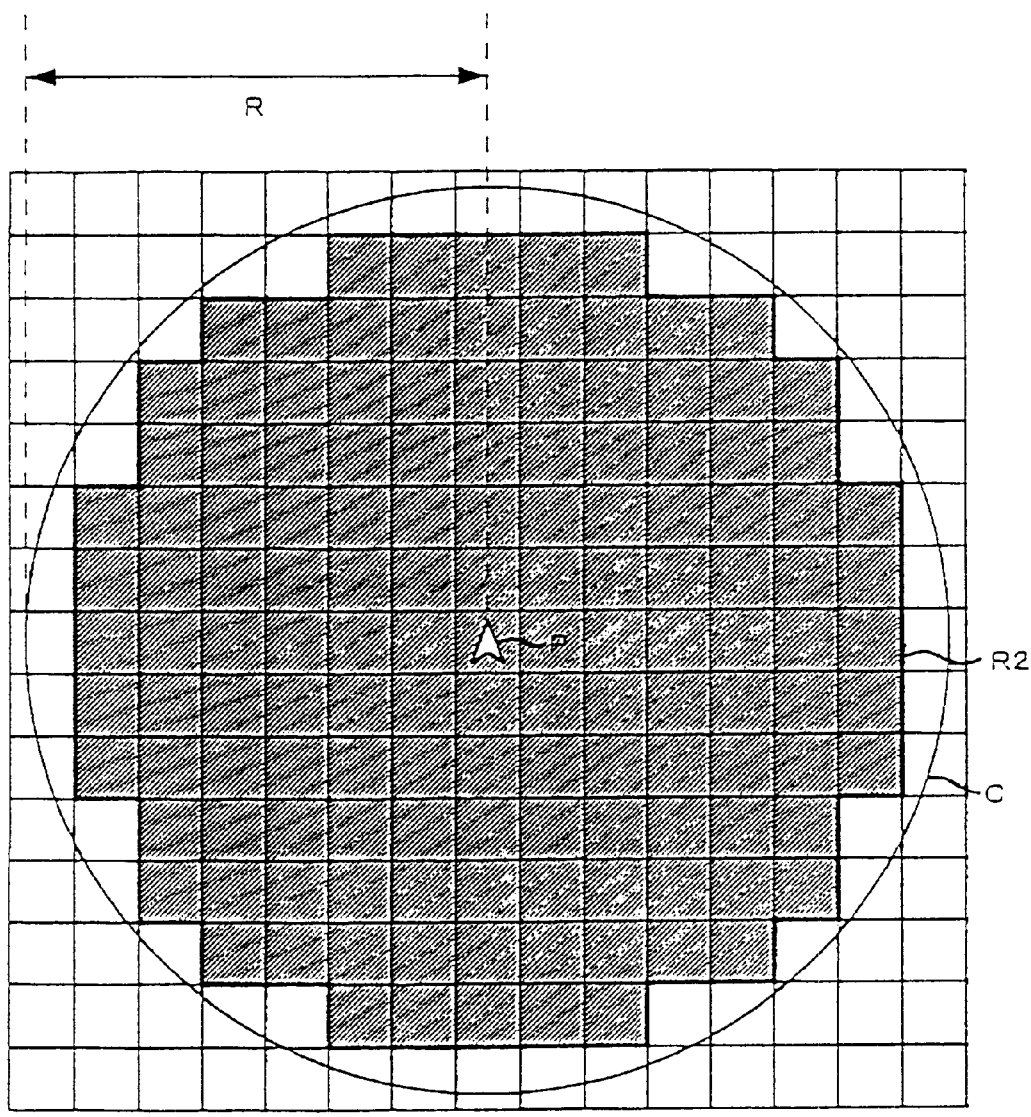
FIG. 20 is a diagram showing a example of the block area for the object of transmitting (No. 2)

FIG. 20 is a diagram showing a example of the block area for the object of transmitting in the Step S44. In FIG. 20, it is assumed that the block area of 15 blocks in each of a lateral direction and a longitudinal direction, setting the self-vehicle position as a center.

In FIG. 20, an area comprising 137 blocks in all included in the circle C with radius R whose center is the self-vehicle position P is set as the block area R2 for the object of transmitting in the Step S44. In contrast to the example shown in FIG. 19, the optimum route RT is not obtained. Therefore the block area R2 is set as an area having a high possibility that the vehicle moves until the time when the another DVD-ROM 1 is loaded in the DVD-ROM drive 14 after the DVD-ROM 1 is ejected.

The way of setting the block area R2 is not limited to the way explained with FIG. 20. Considering the case that after the DVD-ROM 1 is ejected reproduction of music, image, etc. is executed by loading another disc, it is desirable that the block area R2 covers an area where the vehicle moves within 1 hour to 2 hours. A figure of the block area R2 is not limited to a circle. As compared with Step 543, it is necessary to consider the possibility that the vehicle moves in all directions. Therefore the number of block units included in the block area R2 is larger that that of the block area R1, so that the time necessary for the transmission processing becomes longer. In practice, a figure or a size of the block area R2 can be varied in accordance with a size of each block or a travelling area of the vehicle. Further, the block area R2 can be set so that a forward portion of the block area in the travelling direction becomes broader than the rest.

After the processing of the Step S43 of the Step S44 is completed, in Step S45 it is determined whether the block map data corresponding to each object block of the selected block area R1 or R2 has been already stored on the hard disc 15. It is unnecessary to transmit the block map data which has been already transmitted to and stored on the map data storing area 15a of the hard disc 15. Therefore the determination in the Step S45 is executed in advance to prevent the unnecessary transmission. There are some ways of the determination in the Step S45, such as the way to refer the name of blocks stored on the map data storing area 15a sequentially, the way. to set or reset a flag indicating the presence or the absence of storing of each block map data in a management area of the hard disc 15 and refer the flag at the time of the transmission, etc.

As a result of the determination in the Step S45, if the objective block map data has not been stored on the hard disc 15 yet (Step S45; NO), the processing of Step S46 is executed. On the other hand, if the objective block map data has been already stored on the hard disc 15 (Step S45; YES), the processing of Step S47 is executed without that of Step S46 is executed.

In the Step S46, the block map data of each block units stored on the DVD-ROM 1 is read from the DVD-ROM drive 14, and written on the map data storing area 16a of the hard disc 15 as shown in FIG. 6 used for the explanation of the first embodiment.

As shown in FIG. 6, after the block map data stored on the DVD-ROM 1 is read out of the DVD-ROM drive 14, it is temporarily stored on the transmission buffer 13a of the RAM 13. The transmission buffer 13a is a storing area on the RAM 13 provided for the transmission processing in this embodiment, and has the capacity that the block map data at least in one block can be stored. After that, the block map data stored on the transmission buffer 13a is written on the predetermined storing position of the map data storing area 15a. The CPU 11 controls the timing of the transmission between the DVD-ROM driver 14 and the RAM 13, and the transmission between the RAM 13 and the hard disc 15.

In Step S47, it is determined whether any block unit for the object exists in the block area R1 or R2 yet. As a result, if the block unit for the object remains in the area R1 or R2 (Step S47; YES), the transmission processing shown in the Steps S45 to S47 is executed for the block. On the other hand, if all blocks in the area R1 or R2 has been already transmitted (Step S47; No), the processing of the Step S48 is executed.

In the Step S48, a message indicating the end of the transmission is displayed on the display 20. Therefore a user can understand that it is possible to eject the DVD-ROM 1.

When the new map data is written on the map data storing area 15a at transmitting to the hard disc 15, it may be written on a free space while the map data transmitted at the past ejection is remained. On the other hand, the new map data may be overwritten on the map data transmitted at the past ejection. In the former manner, if an assigned capacity becomes full and it is impossible to write the new block map data on it, the stored block map data may be deleted in accordance with the predetermined conditions. On the other hand, in the latter manner it is impossible to use the stored map data. However, there is a merit that the capacity of the map data storing area 15a can be smaller.

Returning to FIG. 17, in Step S38, after the necessary transmission processing is exited, the ejecting operation of the DVD-ROM drive 14 is executed. Therefore DVD-ROM 1 is ejected out of the DVD-ROM drive 14. It is possible to load another disc.

Next, in Step S39 the navigation operation is executed by using the map data stored on the hard disc 15. In Step S40, by watching the detecting signal from the operation unit 19, it is determined whether continuing of the navigation operation is instructed through the predetermined operation. If quitting the navigation operation is not instructed (Step S40; NO), the navigation operation is continued. On the other hand, if quitting the navigation operation is instructed (Step S40; YES), the processing shown in FIG. 4 is exited.

Figure 21:
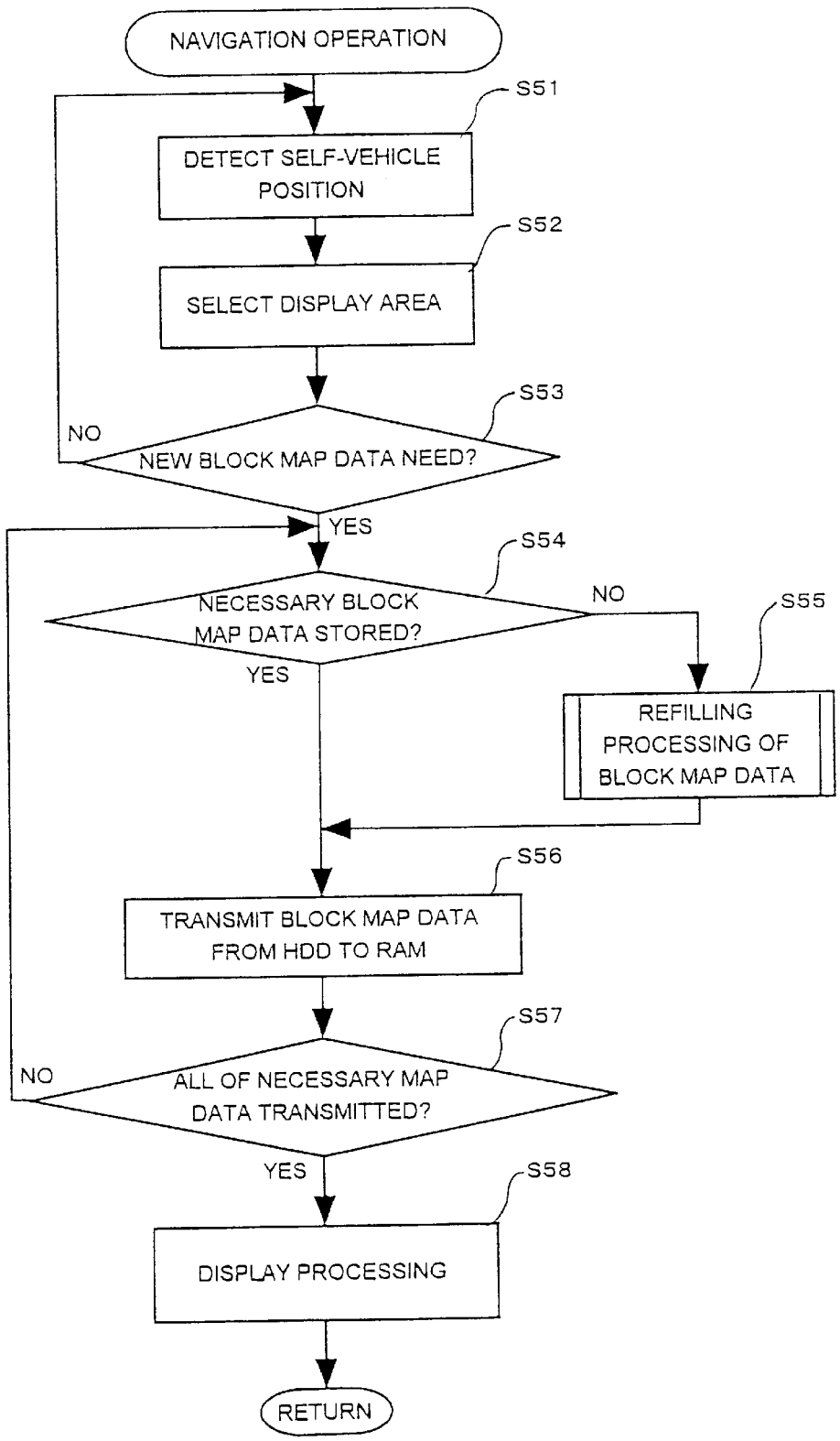
FIG. 21 is a flow chart showing the navigation operation using the map data stored on the storage device.

The processing corresponding to the navigation operation of the Step S39 will be explained in detail with reference to a flaw chart of FIG. 21. After the processing shown in FIG. 21 is started, the self-vehicle position P is detected in Step S51. The self-vehicle position data including latitude and longitude is obtained on the basis of the output from the sensor 16 and the position data from the GPS receiver 17. Subsequently, a display area on the map for the object of displaying is selected on the basis of the self-vehicle position in Step S52.

The display area selected in the Step S52 will be explained with reference to the FIG. 22. FIG. 22 shows an area comprising 35 blocks in all of 5 blocks in the lateral direction by 7 blocks in the longitudinal direction, viewed from the vehicle position. In FIG. 22, a block B101 to a block B135 are indicated in the order from upper left to under right.

In FIG. 22, a display area D1 when the vehicle is positioned at the self-vehicle position P1 and a display area D2 when the vehicle is positioned at the self-vehicle position P2 are described respectively by the dotted lines. The display areas D1, D2 are set as a little larger rectangular area than the size of each block. Roads, etc., in the display area D1, D2 are displayed on the display 20. However, a figure of the display area D1, D2 in FIG. 22 is one example, and can be set as a larger one or a smaller one in practice.

In FIG. 22, the display area D1 is overlapped with blocks B123, B124, B128, and B129, so that block map data of the 4 blocks is necessary for the display processing. The display area D2 is overlapped with blocks B112, B113, B114, B117, B118, and B119, so that block map data of the 6 blocks is necessary for the display processing. In this manner, in the Step S52, a display area can be selected in accordance with the movement of the vehicle, and blocks as the objects of displaying can be selected on the basis of the selected display area.

In Step S53, in advance of the transmission of necessary block map data to the RAM 13, it is determined whether new block map data corresponding to the blocks selected for the objects of displaying in the Step S52 is necessary. The block map data necessary for the display processing is transmitted from the hard disc 15 or the DVD-ROM drive 14 to the display controller 21 via the transmission buffer 13b for display as shown in FIG. 14 used for the explanation of the first embodiment. Therefore in the Step S53 it is determined whether the necessary block map data has already stored on the transmission buffer 13b for display.

As a result of the determination in the Step S53, if the new block map data to be transmitted to the transmission buffer 13b for display is necessary (Step S53; YES), the processing of Step S54 is executed. On the other hand, the new block map data is not necessary because the necessary block map data has already stored on the transmission buffer 13b for display (Step S53; NO), the processing of Step S51 is executed.

In Step S54, it is determined whether block map data determined as necessary data in Step S53 has already stored on the map data storing area 15a of the hard disc 15 (Step S54). This determination can be performed as is the case with Step S45 of FIG. 18. As a result of Step S54, if it has not stored on the map data storing area 15a yet (Step S54; NO), the processing of Step S56 is executed. If it has already stored on the map data storing area 15a (Step S54; YES), the processing of Step S56 is executed.

For example, if the vehicle goes out of the optimum route RT shown in FIG. 19 or out of the block area R2 shown in FIG. 20, the processing of the Step S55 is executed. Therefore even if the necessary block map data is not stored on the hard disc 15 under that condition, the processing of refilling the necessary block map data with the hard disc 15 to continue the navigation operation is executed in the Step S55.

The processing of refilling the map data in the Step S55 will be explained with reference to FIG. 23. As shown in FIG. 23, a warning inducing a user to load the DVD-ROM 1 storing the map data is given by displaying a message on the display 20 and outputting a guide voice from the speaker 24 in Step S61. For example, the warning can be given by displaying a message, such as "TO CONTINUE NAVIGATION, LOAD MAP DISC IN DISC PLAYER".

In Step S62, it is determined whether any disc is loaded in the DVD-ROM drive 14 by watching the status of loading. If a disk is loaded in the DVD-ROM drive 14 (Step S62; YES), the processing of Step S63. If no disc is loaded in DVD-ROM drive 14 (Step S62; NO), watching operation is continued.

In Step S63, it is determined whether the loaded disc is a DVD-ROM 1 for the map data. As a result of the determination, if the loaded disc is not a DVD-ROM 1 for the map data (Step S63; NO), the processing of Step S64 is executed. If the loaded disc is a DVD-ROM 1 for the map data (Step S63; YES), the processing of Step S67 is executed.

In Step S64, the predetermined message indicating that the species of loaded disc is different from that of an appropriate disc for the processing of refilling. Further, a similar message is outputted from the speaker 24. For example, a message, such as "LOADED DISC IS NOT MAP DISC", etc., can be used.

In Step S65, loading a disc in to the DVD-ROM drive 14 is watched as is the case with the Step S62. If a result of determination becomes "YES", in Step S66 it is determined whether the DVD-ROM 1 for the map data is loaded as is the case with the Step S63. As a result, if the DVD-ROM 1 for the map data is loaded (Step S66; YES), the processing of Step S67 is executed. If the loaded disc is not the DVD-ROM 1 for the map data (Step S66; NO), the processing of Step S68 is executed.

After loading of the DVD-ROM 1 for the map data is determined in the Step S63 or S66, the transmission processing of the map data to the hard disc 15 is executed in Step S67 as is the case with the Step S37 of FIG. 17. This processing is executed in accordance with a flaw chart shown in FIG. 18 as mentioned above. It is desirable that a message allowing an ejection of the DVD-ROM 1 is displayed at the same time of displaying the message indicating the end of the transmission to enable a user to load a desirable disc in the DVD-ROM drive 14 in the Step 48 of FIG. 18. After the processing of Step S67 is exited, the processing of Step S56 shown in FIG. 21 is executed.

After it is determined twice that loading of the DVD-ROM 1 for the map data is failed in the Steps S63 and S66, the executing navigation operation is quit without executing the processing of the refilling the necessary map data in Step S68. The processing of waiting the loading of the DVD-ROM 1 storing the map data can be executed while the processing from the Step S64 to the Step S66 is executed once or repeatedly.

Returning to FIG. 21, in Step S56, the transmission processing of the block map data from the DVD-ROM drive 14 to the RAM 13 is executed. As shown in FIG. 14 used for the explanation of the first embodiment, under the control of the CPU 11, the DVD-ROM drive 14 reads the necessary block map data from the DVD-ROM 1, and writes it on the transmission buffer 13b for display of the RAM 13. After that, the block map data is stored on the transmission buffer 13b for display until it is used for the display processing in the display controller 21 as mentioned later.

Subsequently, in Step S57, it is determined whether all of the block map data which is determined as necessary data in the Step S53 have been already transmitted to the RAM 13. As a result of the determination, if all of the block map data have been transmitted to the RAM 13 (Step S57; YES), the processing of Step S58 is executed. If the block map data to be transmitted remains yet (Step S57; NO), the processing on and after the Step S54 is executed.

In Step S58, the display processing is executed by using the block map data stored on the RAM 13. Namely, as shown in FIG. 14 and 15, the block map data necessary for the display processing is sequentially read from the transmission buffer 13*b* for display of the RAM 13, and outputted to the display controller 21. Then the display processing is executed. As a result, a display necessary for the navigation operation is displayed on the screen of the display 20.

(2) The Processing at the Pressing the Download-eject Button 190*b*

The processing executed under the condition that the download-eject button 190*b* is pressed when the DVD-ROM 1 is loaded in the DVD-ROM drive 14 will be explained with reference to FIG. 24.

The operation of pressing the eject button 190*a* presupposes that a user ejects the DVD-ROM 1 without being conscious of continuing the navigation operation. Therefore it is notified that the navigation operation can not be executed by the ejecting. Then after the map data stored on the DVD-ROM 1 is transmitted to the hard disc 15, the DVD-ROM 1 is ejected.

However, the operation of pressing the download-eject button 190*b* presupposes that a user is apparently conscious of continuing the navigation operation even if the DVD-ROM 1 is ejected. Therefore if the download-eject button 190*b* is pressed, the map data stored on the DVD-ROM 1 is immediately transmitted to the hard disc 15 without notifying that the navigation operation can not be executed.

FIG. 24 is a flaw chart showing the transmission processing at the time the download-eject button 190*b* is pressed. In FIG. 24, it is determined whether the download-eject button 190*b* is pressed by watching a detecting signal from the input device 190 in Step S71. As a result of the determination, if the download-eject button 190*b* is not pressed (Step S71; NO), watching the detecting signal is continued. If the download-eject button 190*b* is pressed (Step S71; YES), the processing of Step S72 is executed.

In Step S72, as is the case with the Step S32 of FIG. 17, it is determined whether the navigation operation is executed to prevent unnecessary transmission. As a result of the determination, if the navigation operation is not executed (Step S72; NO), the processing of Step S73 is executed. If the navigation operation is executed (Step S72; YES), the processing of Step S74 is executed.

In Step S73 the navigation operation is not executed, so that the predetermined message indicating that the pressing of the button is invalid is displayed on the display 20. Further, the similar message is outputted by voice from the speaker 24. Then the processing is exited.

On the other hand, in Step S74, it is determined whether any disc is loaded in the DVD-ROM drive 14 by watching the status of loading. If no disc is loaded in DVD-ROM drive 14 (Step S74; NO), the processing of Step S75. If a disk is loaded in the DVD-ROM drive 14 (Step S74; YES), the processing of Step S76.

In Step S75, as is the case with Step S61 of FIG. 23, the predetermined warning inducing a user to load the DVD-ROM 1 storing the, map data is given by displaying a message on the display 20 and outputting a guide voice from the speaker 24. The processing of the Steps S76 and S77 which is one in case that the result of the determination of the Step S76 is "NO" is executed as is the case with the processing of the Steps S63 and S64. If the result of the determination of the Step S76 becomes "YES" so that it is ascertained that the DVD-ROM 1 for the map data is loaded, the transmission processing of the map data to the hard disc 15 shown from the Step S37 to the Step S40 in FIG. 17 is executed.

In Step S78 following with the Step S75 or S77, it is determined whether any disc is loaded in the DVD-ROM drive 14 within the predetermined time period by watching the status of loading as is the case with the Step S74. If the result of the determination becomes "YES", it is determined whether the DVD-ROM 1 for the map data is loaded in the Step S79 as is the case with the Step S46. As a result, if the DVD-ROM 1 for the map data (Step S79; YES), the processing of the Step S37 of FIG. 17 is executed as mentioned above. On the other hand, if a disc is not loaded in the DVD-ROM drive 14 (Step S78; NO), or if a disc other than the DVD-ROM 1 is loaded in the DVD-ROM drive 14 (Step S79; NO), the processing of the Step S80 is executed.

In the Step S50, the predetermined message indicating that normal operations, which are the transmission processing and ejecting of the DVD-ROM 1, can not be executed is displayed on the display 20. Further, the similar message is outputted by voice from the speaker 24, then the processing is exited.

As mentioned above, if the download-eject button 190*b* is pressed, it is possible to eject the DVD-ROM 1 and transmit the map data by one-time operation. Also, it is possible to omit a guide to confirm the continuation of the navigation operation. Therefore it is possible to eject a disc quickly and to improve the convenience of he navigation system.

(3) The Processing at the Pressing the Download Button 190*c*

The processing executed under the condition that the download button 190*c* is pressed when the DVD-ROM 1 is loaded in the DVD-ROM drive 14 will be explained with reference to FIG. 25.

The operation of pressing the download button 190*c* presupposes that a user intends to transmit the map data stored on the DVD-ROM 1 to the hard disc and to obtain the comfort in the navigation operation by changing a storage device for reading the map data to the hard disc 15 having a high access time. Therefore it the download button 190*c* is pressed, the transmission processing of the map data to the hard disc 15 is executed without ejecting the DVD-ROM 1. For example, if the download button 190*c* is pressed after the optimum route is set, the map data indicating an area around optimum route between the self-vehicle position and a destination is read from the DVD-ROM 1, and is transmitted to the hard disc 15. If the optimum route is set without pressing the download button 190*c*, the map data indicating an area around optimum route between the self-vehicle position and a destination can be immediately read from the DVD-ROM 1, and can be transmitted to the hard disc 15. In this case, a user sets only a destination. The following setting of the optimum route and transmitting operation of the map data are automatically executed.

If a user designates a desirable point or area and press the download button 190*c*, the map data indicating an area around the desirable point or area is read from the DVD-ROM 1 and transmitted to the hard disc 15.

FIG. 25 is a flaw chart showing the transmission processing at the time the download button 190*c* is pressed. In FIG. 25, the processing from Step S82 to Step S89 is the same as that from Step S72 to Step S79 of FIG. 24. Therefore the explanation of the processing from Step S82 to Step S89 is omitted. The processing of Steps S81, S90, and S91 is different from that of FIG. 24. Therefore the processing of Steps S81, S90, and S91 will be explained.

In Step S81, it is determined whether the download button 190c is pressed by watching a detecting signal from the input device 190. As a result of the determination, if the download button 190c is not pressed (Step S81; NO), watching the detecting signal is continued. If the download button 190c is pressed (Step S81; YES), the processing of Step S82 is executed.

In Step S80, the predetermined warning inducing that it is impossible to download the map data to the hard disc 15 because of unloading of the DVD-ROM 1 for map data is given by displaying a message on the display 20 and outputting a guide voice from the speaker 24. Then the processing is exited.

After the loading of the DVD-ROM 1 for map data is determined in Step S86 or S89, the transmission processing of the map data to the hard disc 15 is executed as is the case with that of Step S37 of FIG. 17. Therefore in the processing of FIG. 25 the map data is transmitted to the hard disc 15 without ejecting a disc. That is a different point from the processing of FIG. 24. The processing of Step S91 is executed in accordance with the flow chart shown in FIG. 18. After the processing of the Step S91, the processing of the Step S39 of FIG. 17 is executed so that the navigation operation is executed by using the map data stored on the hard disc 15.

As mentioned above, if the download button 190c is pressed, it is possible to transmit the map data of the DVD-ROM 1 to the hard disc 15 at the convenient timing for a user. After that, for the foreseeable future, it is possible to continue the navigation operation by using the map data stored on the hard disc 15. Therefore it is possible to provide a user-friendly navigation system.

As mentioned above, in the navigation system using the transmission processing of the present invention, if the eject button 190a, etc., is pressed in order to load the different disc from the disc for the map data in the DVD-ROM 14, the transmission processing of the map data from the DVD-ROM 1 to the hard disc 15 is executed by selecting a plurality of blocks in the predetermined area on the basis of the self-vehicle position as the object of transmitting. Therefore, for a fixed period of time, the block map data within an area having a high possibility of use is selectively stored on the hard disc 15, and it is possible to continue the navigation operation by using the stored block map data. Accordingly, while loading a disc for music or image in the DVD-ROM drive 14 and reproducing the music or the image, it is possible to continue the navigation operation without trouble. Generally, if the capacity of the map data storing area 15a is comparative small, it is possible to cover an area where the vehicle moves. Therefore free spaces other than the map data storing area 15a can be effectively used for the other application, and the map data can be read at a high access speed. Consequently, a user can obtain the comfort in the navigation operation.

In the above-mentioned embodiment, the DVD-ROM 1 is used for a recording medium storing the map data. However, a recording format to the recording medium is not limited to the DVD format.

The navigation system can be provided not only as an individual navigation device but also a system using a personal computer which has a hard disc, for example. In this case, the software executing the transmission processing of the present invention is run on the personal computer, so that the function of the present invention can be implemented.

In the above-mentioned embodiment, the identical music information AD is consecutively recorded on the two MDs.

In addition, the present invention can be applied for recording the music information AD on the other recordable optical disc, such as CD-R, CD-R/W (Rewritable), DVD-R (Recordable), DVD-R/W (Rewritable), DVD-RAM (Random Access Memory), or the like.

Further, in the above-mentioned embodiment, the vehicle is used for an example of a movable body. However, the movable body is not limited to the vehicle. For example, the present invention can be used for an airplane, a boat, etc. Furthermore, if the navigation system is applied for a mobile device, such as a notebook-size personal computer, a mobile computer, a cellular phone, etc., a user can accurately find a present position while carrying it.

Moreover, a main processing of the above-mentioned navigation operation can be executed in a navigation center build as a building. Then a result of the main processing can be transmitted to a terminal device having a display, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. H(Heisei)11-316894 filed on Nov. 8, 1999 and Japanese Patent Application No. H(Heisei)11-334640 filed on Nov. 25, 1999 including the specification, claims, drawings and summary is incorporated herein by reference in its entirety.

What is claimed is:

1. A navigation system comprising:
    a present position detecting device for detecting a present position of a movable body;
    a reading device for reading map data recorded on a recording medium;
    a nonvolatile storage device for storing the map data thereon;
    a selecting device for selecting an area as an object to be transmitted in accordance with the present position;
    a transmitting device for reading the recorded map data corresponding to the area from the recording medium and transmitting the read map data to the nonvolatile storage device at a predetermined timing; and
    a controlling device for controlling a navigation operation to assist the movable body in traveling on the basis of the recorded map data on the recording medium and the stored map data on the nonvolatile storage device.

2. A navigation system comprising:
    a present position detecting device for detecting a present position of a movable body;
    a reading device for reading map data recorded on a recording medium;
    a nonvolatile storage device for storing the map data thereon;
    a selecting device for selecting an area as an object to be transmitted in accordance with the present position;
    a transmitting device for reading the recorded map data corresponding to the area from the recording medium and transmitting the read map data to the nonvolatile storage device at a predetermined timing; and
    a controlling device for controlling a navigation operation to assist the movable body in traveling on the basis of the recorded map data on the recording medium and the stored map data on the nonvolatile storage device, wherein the nonvolatile storage device has a faster access time than the reading device.

3. The navigation system according to claim 2, wherein the nonvolatile storage device is provided with a hard disc device.

4. The navigation system according to claim 1, wherein the controlling device controls the navigation operation on the basis of the stored map data on the nonvolatile storage device if the map data necessary to the navigation operation is stored on the nonvolatile storage device, and on the basis of the recorded map data on the recording medium if the map data necessary to the navigation operation on the recording medium is readable and is not stored on the nonvolatile storage device.

5. The navigation system according to claim 1, wherein the nonvolatile storage device has a map data storing area which stores the transmitted map data.

6. The navigation system according to claim 5, wherein the navigation system further comprising a map data deleting device for deleting part of the map data stored on the map data storing area in accordance with a predetermined condition if the map data storing area becomes full at the transmitting of the map data by the transmitting device.

7. A navigation system comprising:
a present position detecting device for detecting a present position of a movable body;
a reading device for reading map data recorded on a recording medium;
a nonvolatile storage device for storing the map data thereon;
a selecting device for selecting an area as an object to be transmitted in accordance with the present position;
a transmitting device for reading the recorded map data corresponding to the area from the recording medium and transmitting the read map data to the nonvolatile storage device at a predetermined timing; and
a controlling device for controlling a navigation operation to assist the movable body in traveling on the basis of the recorded map data on the recording medium and the stored map data on the nonvolatile storage device,
wherein the transmitting device transmits the map data every time when the movable body moves a predetermined distance.

8. A navigation system comprising:
a present position detecting device for detecting a present position of a movable body;
a reading device for reading map data recorded on a recording medium;
a nonvolatile storage device for storing the map data thereon;
a selecting device for selecting an area as an object to be transmitted in accordance with the present position;
a transmitting device for reading the recorded map data corresponding to the area from the recording medium and transmitting the read map data to the nonvolatile storage device at a predetermined timing; and
a controlling device for controlling a navigation operation to assist the movable body in traveling on the basis of the recorded map data on the recording medium and the stored map data on the nonvolatile storage device,
wherein block map data is recorded on the recording medium every block unit into which the entire map is divided, the reading device reads the map data from the recording medium in the block map data unit, the nonvolatile storage device stores and reads the map data in the block map data unit.

9. The navigation system according to claim 8, wherein the block map data unit is an area having two parallel sides in an east-west direction and two parallel sides in a north-south direction.

10. The navigation system according to claim 8, wherein the transmitting device determines whether the block map data as an object of transmitting is stored on the nonvolatile storage device, and transmits only block map data which is not stored on the nonvolatile storage.

11. The navigation system according to claim 8, wherein the object of transmitting by the transmitting device is set to an area comprising a plurality of block units on the basis of the block unit including the present position.

12. The navigation system according to claim 11, wherein the object of transmitting by the transmitting device is set to the area having a broader portion in a forward side of a travelling direction.

13. The navigation system according to claim 8, wherein the object of transmitting by the transmitting device is set to an area comprising a plurality of block units, which is overlapped with an optimum route from the present position to a destination.

14. A navigation system comprising:
a present position detecting device for detecting a present position of a movable body;
a communicating device for communicating with an external source to the movable body to obtain map data;
a nonvolatile storage device for storing the map data thereon;
a selecting device for selecting an area as an object to be transmitted in accordance with the present position;
a transmitting device for obtaining the map data from the external of the movable body through the communicating device and transmitting the obtained map data to the nonvolatile storage device at a predetermined timing; and
a controlling device for controlling a navigation operation to assist the movable body in traveling on the basis of the recorded map data on the recording medium and the stored map data on the nonvolatile storage device.

15. A navigation system comprising:
a present position detecting device for detecting a present position of a movable body;
a reading device for being loaded with a recording medium on which map data is recorded and reading the map data from the loaded recording medium;
a nonvolatile storage device for storing the map data thereon;
an operating device for providing an instruction to eject the recording medium loaded in the reading device;
a selecting device for selecting an area as an object to be transmitted in accordance with the present position;
a transmitting device for reading the map data from the recording medium through the reading device and transmitting the read map data to the nonvolatile storage device when the instruction to eject is provided by the operating device;
an eject controlling device for controlling an ejecting operation of the recording medium from the reading device after the transmitting operation is completed by the transmitting device; and
a controlling device for controlling a navigation operation to assist the movable body in traveling on the basis of the stored map data on the nonvolatile storage device after the recording medium is ejected from the reading device.

16. The navigation system according to claim 15, wherein the nonvolatile storage device has a faster access time than the reading device.

17. The navigation system according to claim 16, wherein the nonvolatile storage device is provided with a hard disc device.

18. The navigation system according to claim 16, wherein the nonvolatile storage device has a map data storing area which stores the transmitted map data.

19. The navigation system according to claim 16, wherein the navigation system further comprising a notifying device for notifying an executing status of transmitting by the transmitting device.

20. The navigation system according to claim 19, wherein the notifying device notifies a guide message to select continuing or quitting of the navigation operation when the instruction to eject is provided by the operating device, the operation device further provides;an instruction to continue or quit the navigation operation corresponding to the guide message, the transmitting device transmits the map data when the instruction to continue the navigation operation is provided by the operation device, the controlling device quits the navigation operation when the instruction to quit the navigation operation is provided by the operation device.

21. The navigation system according to claim 19, wherein the notifying device notifies a warning to induce loading of the recording medium in the reading device if an necessary map data is not stored on the nonvolatile storage device while the navigation operation is executed on the basis of the map data stored on the nonvolatile storage device, the transmitting device transmits the necessary map data if the recording medium is loaded in the reading device in accordance with the warning, the controlling device quits the navigation operation if the recording medium is not loaded in the reading device.

22. The navigation system according to claim 21, wherein the notifying device notifies the warning repeatedly predetermined times if the recording medium is not loaded in the reading device despite of the warning, the controlling device quits the navigation operation if the recording medium is not loaded in the reading device after the warning is notified the predetermined times.

23. The navigation system according to claim 15, wherein block map data is recorded on the recording medium every block unit into which the entire map is divided, the reading device reads the map data from the recording medium in the block map data unit, the nonvolatile storage device stores and reads the map data in the block map data unit.

24. The navigation system according to claim 23, wherein the transmitting device determines whether the block map data as an object of transmitting is stored on the nonvolatile storage device, and transmits only block map data which is not stored on the nonvolatile storage.

25. The navigation system according to claim 23, wherein the object of transmitting by the transmitting device is set to an area comprising a plurality of block units on the basis of the block unit including the present position.

26. The navigation system according to claim 23, wherein the object of transmitting by the transmitting device is set to an area comprising a plurality of block units, which is overlapped with an optimum route from the present position to a destination.

27. A navigation system comprising:
a present position detecting device for detecting a present position of a movable body;
a reading device for being loaded with a recording medium on which map data is recorded and reading the map data from the loaded recording medium;
a nonvolatile storage device for storing the map data thereon;
an operating device for providing an instruction to transmit the map data from the reading device to the nonvolatile storage device;
a selecting device for selecting an area as an object to be transmitted in accordance with the present position; and
a transmitting device for reading the map data from the recording medium through the reading device and transmitting the read map data to the nonvolatile storage device when the instruction to transmit is provided by the operating device.

28. The navigation system according to claim 27, wherein the object of transmitting by the transmitting device is set to an area selected on the basis of the present position.

29. The navigation system according to claim 27, wherein the object of transmitting by the transmitting device is set to an area around a designated point or a designated area by a user.

30. The navigation system according to claim 27, wherein the object of transmitting by the transmitting device is set to an area around an optimum route from the present point to a destination.

31. The navigation system according to claim 30, wherein the operation device provides an instruction to seek an optimum route to a designated destination, the transmitting device transmits the map data when seeking of the optimum route is completed.

32. A navigation system comprising:
a present position detecting device for detecting a present position of a movable body;
a reading device for reading map data recorded on a recording medium;
a readable/writable storage device for storing the map data thereon;
a selecting device for selecting an area as an object to be transmitted in accordance with the present position;
a transmitting device for reading the recorded map data corresponding to the area from the recording medium and transmitting the read map data to the readable/writable storage device at a predetermined timing; and
a controlling device for controlling a navigation operation to assist the movable body in traveling on the basis of the recorded map data on the recording medium and the stored map data on the readable/writable storage device.

* * * * *